(12) United States Patent
Okano et al.

(10) Patent No.: US 7,771,826 B2
(45) Date of Patent: *Aug. 10, 2010

(54) ANTIREFLECTION FILM, PRODUCING METHOD OF ANTIREFLECTION FILM, POLARIZING PLATE AND DISPLAY DEVICE

(75) Inventors: Satoshi Okano, Tokyo (JP); Yoshikazu Ojima, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/279,752

(22) PCT Filed: Feb. 20, 2007

(86) PCT No.: PCT/JP2007/053040

§ 371 (c)(1),
(2), (4) Date: Aug. 18, 2008

(87) PCT Pub. No.: WO2007/097303

PCT Pub. Date: Aug. 30, 2007

(65) Prior Publication Data

US 2009/0002821 A1 Jan. 1, 2009

(30) Foreign Application Priority Data

Feb. 27, 2006 (JP) ............................. 2006-049919

(51) Int. Cl.
*B32B 27/38* (2006.01)
*G02B 1/11* (2006.01)

(52) U.S. Cl. .................. 428/413; 428/323; 427/163.1; 359/485

(58) Field of Classification Search ................. 428/413; 427/163.1; 359/485
See application file for complete search history.

(56) References Cited

U.S. PATENT DOCUMENTS 6,228,499 B1 * 5/2001 Nakauchi et al. ............ 428/412

FOREIGN PATENT DOCUMENTS

| JP | 2005283786 | 10/2005 |
| JP | 2005338549 | 12/2005 |
| JP | 2005-157037 | * 6/2009 |

* cited by examiner

*Primary Examiner*—Gwendolyn Blackwell
(74) *Attorney, Agent, or Firm*—Lucas & Mercanti, LLP

(57) ABSTRACT

Disclosed is an antireflection film having an antireflection layer excellent in chemical resistance, surface hardness and wet-heat-resistant adhesion. Also disclosed are a method for producing such an antireflection film, a polarizing plate using such an antireflection film, and a display. Specifically disclosed is an antireflection film which comprises a hard coat layer and an antireflection layer on at least one side of a transparent resin film. This antireflection film is characterized in that the hard coat layer contains at least an active ray curable resin, a silicone surface active agent and a polyoxyether compound, and the mass ratio between the silicone surface active agent content and the polyoxyether compound content is from 1.0:1.0 to 0.10:1.0.

19 Claims, No Drawings

ANTIREFLECTION FILM, PRODUCING METHOD OF ANTIREFLECTION FILM, POLARIZING PLATE AND DISPLAY DEVICE

This is a U.S. National Phase Application under 35 U.S.C. 371 of International Application PCT/JP2007/053040, filed on Feb. 20, 2006.

This Application claims the priority of Japanese Application No. 2006-049919, filed Feb. 27, 2006, the entire content of which is hereby incorporated by reference.

TECHNICAL FIELD

The present invention relates to an antireflection film, a producing method of an antireflection film, a polarizing plate, and a display device, in particular, to an antireflection film excellent in chemical resistance, surface hardness, moisture and heat resistant adhesion, a producing method of an antireflection film, a polarizing plate, and a display device.

BACKGROUND ART

In recent years, centrally in the fields, such as an optical lens, a plasma display panel (PDP), a cathode-ray tube display device (CRT), and a liquid crystal image display device of a computer and a word processor, there is proposed an antireflection film having an antireflection layer to reduce surface reflection in order to improve transmittance and contrast and to reduce taking a picture. As an antireflection layer, it is effective to reduce light reflex in a surface boundary between a laminated body and air by a lamination of several layers having proper values of refractive index and optical layer thickness as an optical interference layer. As the optical interference layer, there is provided a low refractive index layer and $SiO_2$ and $MgF_2$ are employed as low refractive index materials.

Although an antireflection film can be produced by a dry type film forming method and a coating type film forming method, the coating type film forming method is generally used from the advantages being easy and cheap. Moreover, in order to provide performances such as scratch resistance and abrasion resistance to an antireflection film, the antireflection film is generally provided with hard coat property in such a way that a hard coat layer is formed as an interlayer on a film base material. The hard coat layer is generally structured with a ultraviolet curable resin, and for example, a ultraviolet curable type (meth)acrylate monomer having a (meth)acrylyl group is used as the ultraviolet curable resin. Further, for the hard coat layer, in order to obtain a uniform surface and to prevent surface defects such as repelling and voids, a fluorine or silicone surfactant having an effect to greatly reduce the surface tension of a coating liquid is employed. However, the hard coat layer in which the (meth)acrylate monomer and only the fluorine or silicone surfactant are used has the following problems. For example, a hard coat film is preserved in a rolled state, and thereafter, the hard coat film is rolled off from the rolled state and an antireflection film is formed in such a way that an antireflection layer is coated on the hard coat layer, In this case, the smoothness of the surface of the hard coat layer is lost, the surface orientation of the fluorine or silicone surfactant is influenced, and the adhesion between the antireflection layer and the hard coat layer decreases. As a result, the chemical resistance, the surface hardness and the moisture and heat resistance adhesion of the antireflection film decreases. These problems causes the reduction of commercial value and productivity.

Conventionally, the concomitant use of a fluorine or silicone surfactant and other surfactants makes the control of surface orientation difficult and also makes it difficult to maintain the stable coating properties of the hard coat layer. Further, it influences greatly the coating properties of an antireflection layer such as aggregation of metallic compounds. Therefore, it is technically difficult. Further, Patent Documents 1 and 2 describe about the technical difficulty of the concomitant use of a nonionic surfactant and a silicone surfactant.

Patent Documents 3 through 6, for example, disclose improvement techniques over the above theme. However, sufficient improvement effects are not acquired with the above techniques. Especially, in the case that an antireflection film is formed after a hard coat layer and a transparent film have been stored on a close contact condition, the improvement effects over the above theme, are not enough.

The present inventor found that when a polyoxy ether compound is used in combination with a silicone surfactant in a specific additive range, stable coating properties can be obtained and the above theme can be solved. As a result, the present inventor achieved the present invention.

There are no teachings about the compound of the present invention in Patent Documents 1 and 2, and Patent Documents 3 through 6 do not teach nor suggest about the above theme solution by the concomitant use of a silicone surfactant and a polyoxy ether compound.

Patent Documents 1: Japanese Patent Unexamined Publication No. 2005-186584

Patent Documents 2: Japanese Patent Unexamined Publication No. 2004-114355

Patent Documents 3: Japanese Patent Unexamined Publication No. 2001-74909

Patent Documents 4: Japanese Patent Unexamined Publication No. 2001-74910

Patent Documents 5: Japanese Patent Unexamined Publication No. 2001-76647

Patent Documents 6: Japanese Patent Unexamined Publication No. 2004-212619

DISCLOSURE OF THE INVENTION

Problem to be Solved by the Invention

An object of the present invention is to provide an antireflection film with an antireflection layer excellent in chemical resistance, surface hardness, moisture and heat resistant adhesion, a producing method of the antireflection film, and a polarizing plate and a display device which employ it.

Means for Solving the Problem

The above-mentioned object of the present invention can be attained by the following structures.

1. In an antireflection film comprising a hard coat layer and an antireflection layer on at least one surface of a transparent resin film, the antireflection film is characterized in that the hard coat layer contains at least an actinic ray curable resin, a silicone surfactant and a polyoxy ether compound, and the content ratio by weight of the silicone surfactant and the polyoxy ether compound is 1.0:1.0 to 0.10:1.0.
2. The antireflection film described in the above-mentioned 1 is characterized in that the polyoxy ether compound is a polyoxyethylene oleyl ether compound.
3. The antireflection film described in the above-mentioned 1 or 2 is characterized in that the antireflection layer includes a low refractive index layer containing hollow silica fine particles.

4. In a producing method of the antireflection film described in any one of the above-mentioned 1 through 3, the antireflection film producing method is characterized in that the hard coat layer is formed on one surface of the transparent resin film, the resultant film is wound up in a roll form, and thereafter, the film is wound off from the roll form and an antireflection layer is coated on the hard coat layer.
5. An antireflection film is characterized by being produced by the antireflection film producing method described in the above-mentioned 4.
6. A polarizing plate is characterized in that the antireflection film described in any one of the above-mentioned 1, 2, 3 and 5 is pasted on at least one surface of a polarizer.
7. A display device is characterized by employing the antireflection film described in any one of the above-mentioned 1, 2, 3 and 5 or the polarizing plate described in the above-mentioned 6.

Effect of the Invention

According to the present invention, it is possible to provide an antireflection film with an antireflection layer excellent in chemical resistance, surface hardness, moisture and heat resistant adhesion, a producing method of the antireflection film, and a polarizing plate and a display device which employ it.

Best Mode for Carrying Out the Invention

Hereinafter, the best mode for carrying out the invention will be explained. However, the present invention is not limited to these.

The present inventor found out that in an antireflection film comprising a hard coat layer and an antireflection layer on at least one surface of a transparent resin film, when the antireflection film is characterized in that the hard coat layer contains at least an actinic ray curable resin, a silicone surfactant and a polyoxy ether compound, and the content ratio by weight of the silicone surfactant and the polyoxy ether compound is 1.0:1.0 to 0.10:1.0, it is possible to obtain the antireflection film with the antireflection layer excellent in chemical resistance, surface hardness, moisture and heat resistant adhesion. As a result, the present inventor achieved the present invention.

Further, the present inventor also found out that it desirable that the antireflection film is produced by the antireflection film producing method characterized in that the hard coat layer is formed on one surface of the transparent resin film, the resultant film is wound up in a roll form, and thereafter, the film is wound off from the roll form and an antireflection layer is coated on the hard coat layer.

Hereinafter, the present invention will be explained in detail.

(Surfactant or Surface Active Agent)

Firstly, silicone surfactants usable in the present invention will now be explained.

Here, the silicone surfactants usable in the present invention include silicone oil. The silicone surfactant is a surfactant in which a part of methyl groups of silicone oil is substituted by a hydrophilic group. The positions of substitution are such as a side chain, the both ends, one end and the both terminal side chains. As a hydrophilic group, utilized are such as polyether, polyglycerin, pyrrolidone, betaine, sulfate, phosphate and quaternary salt.

Among them, preferable is a nonionic surfactant in which a hydrophobic group is constituted of dimethylpolysiloxane and a hydrophilic group is constituted of polyoxyalkylene.

The nonionic surfactant generally refers to a surfactant not provided with a group which dissociates into ion in an aqueous solution, however, is provided with a hydroxyl group of polyhydric alcohols as a hydrophilic group in addition to a hydrophobic group, and further a hydrophilic group such as a polyalkylene chain (polyoxyethylene). Hydrophilic property becomes stronger as the number of an alcoholic hydroxyl group becomes larger or as the polyoxyalkylene chain (polyoxyethylene chain) becomes longer.

Next, silicone oil will be explained. The eilicone oil is roughly divided into straight silicone oil and modified silicone oil, depending on the type of an organic group bonding to a silicon atom. Straight silicone oil refers one to which a methyl group, a phenyl group and a hydrogen atom are bonded as a substituent. Modified silicone oil refers one having a constitutent portion which is secondarily derived from straight silicone oil. On the other hand, classification can be made according to reactivity of silicone oil. These will be summarized as follows.

Silicone Oil
1. Straight silicone oil
1-1 Non-reactive silicone oil: such as dimethyl, methyl, phenyl substituted
1-2. Reactive silicone oil: such as methyl, hydrogen substituted
2. Modified silicone oil Modified silicone oil is one formed by introducing various organic groups into dimethyl silicone oil.

2-1. Non-reactive silicone oil: such as alkyl, alkyl/alalkyl, alkyl/polyether, polyether and higher aliphatic acid ester substituted Alkyl/alalkyl modified silicone oil is silicon oil in which a part of methyl groups of dimethyl silicone oil is substituted by a long-chain alkyl group or a phenylalkyl group.

Polyether modified silicone oil is a silicone type polymer surfactant in which a hydrophilic polyoxyalkylene is introduced into hydrophobic dimethylsilicone.

Higher fatty acid modified silicone oil is silicone oil in which a part of methyl groups of dimethylsilicone oil is substituted by higher aliphatic acid ester.

Amino modified silicone oil is silicone oil having a structure in which a part of methyl groups of the silicone oil is substituted by an amino alkyl group.

Epoxy modified silicone oil is silicone oil having a structure in which a part of methyl groups of the silicone oil is substituted by an alkyl group containing an epoxy group.

Carboxyl modified or alcohol modified silicone oil is silicone oil having a structure in which a part of methyl groups of the silicone oil is substituted by a carboxyl group or an alkyl group containing a hydroxide group.

2-2. Reactive silicone oil: such as amino, epoxy, carboxyl and alcohol substituted Among them, preferably added is polyether modified silicone oil. The number average molecular weight of polyether modified silicone oil is, for example, 1,000 to 100,000 and preferably 2,000 to 50,000.

Examples of specific commercial products of these silicone surfactants (silicone oil) include; SH200, BY16-873, PRX413 (dimethyl silicone oil; produced by Dow Corning Toray Silicone Co., Ltd.), SH510, SH550, SH710 (methylphenyl silicone oil; produced by Dow Corning Toray Silicone Co., Ltd.), SH203, SH230, SF8416 (alkyl modified silicone oil; produced by Dow Corning Toray Silicone Co., Ltd.), SF8417, BY16-208, BY16-209, BY16-849, BY16-872 (amino modified silicone oil; produced by Dow Corning Toray Silicone Co., Ltd.), SF8411, SF8413, BY16-855D (epoxy modified silicone oil; produced by a Dow Corning Toray Silicone Co., Ltd.), BY16-848, BY16-201 (denaturing alcohol silicone oil; produced by Dow Corning Toray Silicone Co., Ltd.), BY16-152 (methacrylate modified silicone oil; produced by Dow Corning Toray Silicone Co., Ltd.), FZ-2222, FZ-2207 (dimethylpolysiloxane polyethylene oxide straight-chain block copolymer; FZ series produced by Nippon Unicar Company Limited), KF-101, KF-102, KF-105 (epoxy modified silicone oil; produced by Shin-Etsu Chemical Co., Ltd.), KF-8008, KF-861, KF-8002 (amino modified silicone oil; produced by Shin-Etsu Chemical Co., Ltd.), KF-6001, KF-6002 (carbinol modified silicone oil; produced by Shin-Etsu Chemical Co., Ltd.), X-22-164A and X-22-2404 (methacryl modified silicone oil; produced by Shin-Etsu Chemical Co., Ltd.), KF-412, KF-414 (alkyl modified silicone oil; produced by Shin-Etsu Chemical Co., Ltd.), KF-910 (ester modified silicone oil; made by Shin-Etsu Chemical Co., Ltd.), SH3749, SH3748, SH8400, SF8410, SF8427, BY16-004, SF8428, SH3771, SH3746, BY16-036 (polyether modified silicone oil; produced by Dow Corning Toray Silicone Co., Ltd.), BYK-UV3500, BYK-UV3510, BYK-333, BYK-331, BYK-337 (polyether modified silicone oil; produced by BYK-Chemie Japan K.K.), TSF4440, TSF4445, TSF4446, TSF4452, TSF4460 (polyether modified silicone oil; produced by GE Toshiba Silicone Co., Ltd.), KF-351 and KF-351A, KF-352, KF-353, KF-354, KF-355, KF-615, KF-618, KF-945, KF-6004 (polyether modified silicone oil; produced by Shin-Etsu Chemical Co., Ltd.). However, the silicone surfactants (silicone oil) are not limited to the above products.

On the other hand, examples of the polyoxy ether compound include polyoxyethylene alkyl ether compounds, such as polyoxyethylene alkyl ether, polyoxyethylene lauryl ether, polyoxyethylene cetyl ether, and polyoxyethylene stearylether, polyoxy-alkyl phenyl ether compounds, such as polyoxyethylene nonylphenyl ether and polyoxyethylene octylphenyl ether; polyoxy-alkylene alkyl ether, polyoxyethylene higher alcohol ether, polyoxyethylene octyl dodecyl ether, etc.

Examples of specific commercial products of polyoxyethylene alkyl ether include EMULGEN 1108 and EMULGEN 1118S-70 (produced by Kao Corp.), examples of specific commercial products of polyoxyethylene lauryl ether include EMULGEN 103, EMULGEN 104P, EMULGEN 105, EMULGEN 106, EMULGEN 108, EMULGEN 109P, EMULGEN 120, EMULGEN 123P, EMULGEN 147, EMULGEN 150, EMULGEN 130K (produced by Kao Corp.), examples of specific commercial products of polyoxyethylene cetyl ether include EMULGEN 210P and EMULGEN 220 (produced by Kao Corp.), examples of specific commercial products of polyoxyethylene stearylether include EMULGEN 220 and EMULGEN 306P (produced by Kao Corp.), examples of specific commercial products of polyoxy-alkylene alkyl ether include EMULGEN LS-106, EMULGEN LS-110, EMULGEN LS-114, and EMULGEN MS-110 (produced by Kao Corp.), and examples of specific commercial products of polyoxyethylene higher alcohol ether include EMULGEN 705, EMULGEN 707, and EMULGEN 709. Among these polyoxy-ether compounds, preferable is polyoxyethylene oleyl ether compound and it is a compound generally represented by Formula (1).

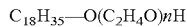

$C_{18}H_{35}$—$O(C_2H_4O)n$H  Formula (1)

In the formula, n represents 2 to 40.

An average additive number (n) of ethylene oxide to an oleyl portion is 2 to 40, preferably 2 to 10, more preferably 2 to 9, and still more preferably 2 to 8. Further, the compound represented by Formula (1) can be obtained by a process of reacting ethylene oxide and oleyl alcohol.

Examples of specific commercial products include EMULGEN 404 (polyoxyethylene (4) oleylether), EMULGEN 408 (polyoxyethylene (8) oleylether), EMULGEN 409P (polyoxyethylene (9) oleylether), EMULGEN 420 (polyoxyethylene (13) oleylether), EMULGEN 430 (polyoxyethylene (30) oleylether) produced by Kao Corp., and NOFABLEEAO-9905 (polyoxyethylene (5) oleylether) produced by Nippon Oil & Fats Corporation.

Here, ( ) represents a numeral of n. The nonionic polyoxy ether compound may be used solely, or in combination with two or more kinds.

The content ratio by weight of a silicone surfactant and a polyoxy ether compound in a hard coat layer is 1.0:1.0 to 0.10:1.0, more preferably 0.70:1.0 to 0.20:1.0. When these compounds are contained in the above content ratio by weight, the effect in the object of the present invention can exhibit.

The preferable additive amount of a polyoxy-ether compound and a silicone surfactant as the total amount of them to the actinic ray curable resin in a hard coat layer is 0.1% by weight to 8.0% by weight, more preferably 0.2% by weight to 4.0% by weight. In these ranges, an antireflection layer excellent especially in chemical resistance, surface hardness and moisture and heat resistant adhesion can be obtained.

Further, a fluorine surfactant, an acrylic based copolymer, an acetylene glycol based compound or the other nonionic surfactants, and a radical polymerizable nonionic surfactant may be used in combination.

Examples of commercial products of the fluorine surfactant include Fluorad FC-430 and FC170 produced by Sumitomo 3M Corporation, Megaface F177, F471 and F482 produced by Dainippon Ink & Chemicals, Inc. Examples of commercial products of acrylic based copolymer include BYK-361N and BYK-358N produced by BYK-Chemie Japan K.K.

Examples of the other nonionic surfactants include polyoxy-alkyl ester compounds, such as polyoxyethylene monolaurate, polyoxyethylene monostearate and polyoxyethylene monoolate; and sorbitan ester compounds, such as sorbitan monolaurate, sorbitan monostearate and sorbitan monoolate. Examples of the acetylene glycol-based compound include Surfynol 104E, Surfynol 104PA, Surfynol 420, Surfynol 440, Dynol 604 (produced by Nisshin Chemical Industry Co., Ltd.).

Examples of the radical polymerizable nonionic surfactant include polyoxyalkylene alkyl phenyl ether(meta)acrylate based polymerizable surfactants, such as "RMA-564", "RMA-S568", and "RMA-1114" (product name produced by NIPPON NYUKAZAT CO., LTD.).

(Antireflection Layer)

The anti-reflection layer owing to optical interference which is employed in the present invention will be described.

(Configuration of Antireflection Layer)

The antireflection layer may be a single-layer structured with only a low refractive index layer or a multi-layer comprising at least one layer of low refractive index layer and at least one layer of high refractive index layer. Also, a multi layer of refractive index layers of three layers or more can be configured.

The hard coat layer (a clear hard coat layer or an antiglare layer) is provided on a transparent film support, and the anti-reflection layer can be laminated on the support surface so as to reduce reflectance because of optical interference in consideration of refractive index, thickness, the number of layers, and the order of layers. The antireflection layer possesses high refractive index layers having a higher refractive index than that of the support and a low refractive index layer having a lower refractive index than that of the support in combination, but an antireflection layer having at least 3 refractive index layers is particularly preferable. It is preferred that a medium refractive index layer (higher refractive index than that of a support or a hard coat layer and lower refractive index than that of a higher refractive index layer), a high refractive index layer and a low refractive index layer are laminated in this order for the three layers of different refractive indices from the support side. A hard coat layer may serve for a high refractive index layer.

Preferable examples of the layer structure in an antireflection film of the present invention are described below. Symbol "/" indicated below means "laminated" here. The support in the present invention is a below-mentioned transparent resin film.

Back coat layer/transparent resin film/hard coat layer/low refractive index layer Back coat layer/transparent resin film/hard coat layer/high refractive index layer/low refractive index layer Back coat layer/transparent resin film/hard coat layer/medium refractive index layer/high refractive index layer/low refractive index layer Back coat layer/transparent resin film/antistatic layer/hard coat layer/medium refractive index layer/high refractive index layer/low refractive index layer Antistatic layer/transparent resin film/hard coat layer/medium refractive index layer/high refractive index layer/low refractive index layer Back coat layer/transparent resin film/hard coat layer/high refractive index layer/low refractive index layer/high refractive index layer/low refractive index layer In order to easily remove stains or fingerprints, an antistain layer is preferably provided on the outermost low refractive index layer. A fluorine-containing organic compound is preferably used in the anti-stain layer.

(Hard Coat Layer)

In the present invention, a hard coat layer is provided on at least one surface of a transparent resin film. This hard coat layer is characterized by containing at least a silicone surfactant, a polyoxy-ether compound and an actinic ray curable resin mentioned later.

The actinic ray curable resin contains as a main component a resin curable through a crosslinking reaction by being exposed with actinic rays like ultraviolet rays or electron rays. The actinic ray curable resin layer preferably contains an ethylenically unsaturated monomer, which is exposed to actinic rays such as UV light or electron beams and cured to form a hard coat layer. Listed as representative actinic ray curable resins are UV curable resins as well as electron beam curable resins. The actinic ray curable resin is preferably a UV curable resin.

Examples of UV curable resins include, for example, UV curable urethane acrylate resins, UV curable polyester acrylate resins, UV curable epoxy acrylate resins, UV curable polyol acrylate resins, or UV curable epoxy resins.

The UV curable urethane acrylate resins are easily prepared in such a manner that acrylate based monomers having a hydroxyl group such as 2-hydroxyethyl acrylate, 2-hydroxyethyl methacrylate (hereinafter, acrylate includes acrylate itself and methacrylate, and acrylate represents both), or 2-hydroxypropyl acrylate are allowed to react with the product which is commonly prepared by allowing polyester polyols to react with isocyanate monomers or prepolymers. For example, those described in Japanese Patent O.P.I. Publication No. 59-151110 can be used.

For example, preferably employed is a mixture comprising 100 parts of Unidick 17-806 (manufactured by Dainippon Ink and Chemicals Inc.) and one part of Coronate L (manufactured by Nippon Urethane Industry Co., Ltd.).

The UV ray curable polyesteracrylate resins include those prepared easily by reacting a polyesterpolyol with 2-hydroxyethylacrylate or 2-hydroxypropylacrylate, disclosed for example, in Japanese Patent O.P.I. Publication No 59-151112.

Examples of the UV ray curable epoxyacrylate resin include those prepared by reacting an epoxyacrylate oligomer in the presence of a reactive diluting agent and a photoinitiator, disclosed for example, in Japanese Patent O.P.I. Publication No. 1-105738.

Examples of the UV ray curable polyol acrylate resin include trimethylolpropane triacrylate, ditrimethylolpropane tetraacrylate, pentaerythritol triacrylate, pentaerythritol tetraacrylate, dipentaerythritol hexaacrylate or alkyl-modified dipentaerythritol pentaacrylate.

The photoinitiators for the UV ray curable resins include benzoine or its derivative, or acetophenones, benzophenones, hydroxy benzophenones, Michler's ketone, α-amyloxime esters, thioxanthones or their derivatives. an oxime ketone derivative, a benzophenone derivative or a thioxanthone derivative. These photoinitiators may be used together with a photo-sensitizer. The above photoinitiators also work as a photo-sensitizer. Sensitizers such as n-butylamine, triethylamine and tri-n-butylphosphine can be used in photo-reaction of epoxyacrylates. The content of the photoinitiators or sensitizers used in the UV ray curable resin composition is 0.1 to 15 parts by weight, and preferably 1 to 10 parts by weight, based on the 100 parts by weight of the UV ray curable resin layer.

Examples of another UV ray curable acrylate resin having one unsaturated double bond in the molecule include methyl acrylate, ethyl acrylate, butyl acrylate, benzyl acrylate, cyclohexyl acrylate, vinyl acetate, and styrene. Examples of another UV ray curable acrylate resin having two or more unsaturated double bonds in the molecule include ethylene glycol diacrylate, propylene glycol diacrylate, divinylbenzene, 1,4-cyclohexane diacrylate, 1,4-cyclohexyldimethyl diacrylate.

The UV curable resins available on the market utilized in the present invention include Adekaoptomer KR, BY Series such as KR-400, KR-410, KR-550, KR-566, KR-567 and BY-320B (manufactured by Asahi Denka Co., Ltd.); Koeihard A-101-KK, A-101WS, C-302, C-401-N, C-501, M-101, M-102, T-102, D-102, NS-101, FT-102Q8, MAG-1-P20, AG-106 and M-101-C (manufactured by Koei Kagaku Co., Ltd.); Seikabeam PHC2210(S), PHC X-9(K-3), PHC2213, DP-10, DP-20, DP-30, P1000, P1100, P1200, P1300, P1400, P1500, P1600, SCR900 (manufactured by Dainichiseika Kogyo Co., Ltd.); KRM7033, KRM7039, KRM7130, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Olex No. 340 Clear (manufactured by Chyugoku Toryo Co., Ltd.); Sunrad H-601, RC-750, RC-700, RC-600, RC-500, RC-611 and RC-612 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

In addition, thiol(meta)acrylate type monomer may be employed. Specific examples include pentaerythritol tetrakisthioglycolate, trismercaptopropyl isocyanurate and the like.

These actinic ray curable resin layers can be applied by any method well known in the art, for example: a gravure coater, a dip coater, a reverse coater, a die coater and ink jet printing.

Light sources to cure layers of UV curable-resin by photocuring reaction are not specifically limited, and any light source may be used as far as UV ray is generated. For example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized. An air cooling or a water cooling light source is preferably used. The preferable irradiation quantity of light may be changed depending on the type of lamp, however, it is preferably from 5 to 500 mJ/cm$^2$, and more preferably from 20 to 150 mJ/cm$^2$.

Irradiation of an actinic ray is preferably carried out under tension in the longitudinal direction of the film and more preferably under tension in both the lateral and the longitudinal directions. The preferable tension is from 30 to 300 N/m. The method to provide tension is not specifically limited and following methods are preferably used a method of providing tension while the film is being transported over back rolls, and a method using a tenter to give tension in the lateral direction or in biaxial directions. A cellulose ester film exhibiting a superior flatness can be obtained using these methods.

An organic solvent used for a coating solution of a UV curable-resin can be selected from, for example, the hydrocarbon series (toluene and xylene), the alcohol series (methanol, ethanol, isopropanol, butanol and cyclohexanol), the ketone series (acetone, methyl ethyl ketone and isobutyl ketone), the ester series (methyl acetate, ethyl acetate and methyl lactate), the glycol ether series and other organic solvents. These organic solvents may be also used in combination. The above mentioned organic solvents preferably contain propylene glycol monoalkyl ether (the alkyl having 1 to 4 carbon atoms) or propylene glycol monoalkyl ether acetate (the alkyl having 1 to 4 carbon atoms) in an amount of 5% by weight or more, and more preferably from 5 to 80% by weight.

The aforementioned coating methods are also used as coating method of a TV ray-curable resin layer coating solution. The wet thickness of the coated TN-curable resin layer is preferably from 0.1 to 30 μm and more preferably from 0.5 to 15 μm. The dry thickness of the coated UV-curable resin layer is preferably 0.1 to 20 μm, more preferably 1 to 20 μm, and most preferably 5 to 20 μm.

A hard coat layer has preferably a pencil hardness of 2 H to 8 H, and more preferably a pencil hardness of 3 H to 6 H. The pencil hardness is a value measured in accordance with a pencil hardness evaluation method prescribed by JIS-K-5400 by the use of test pencils specified in JIS S 6006 after a produced hard coat film sample is moisture-conditioned at 25° C. and 60% RH for 2 hours. Further, if the pencil hardness of the entire film is 2 H to 8 H, it can be deemed that the hard film comprises a hard coat layer.

The UV ray-curable resin layer is preferably irradiated with UV rays during or after drying. The duration of UV ray irradiation is preferably from 0.1 seconds to 5 minutes in order to secure the exposure amount from 5 to 150 mJ/cm$^2$ as mentioned above. In view of working efficiency and hardening efficiency of the UV-curable resin layer, the duration is more preferably from 0.1 to 10 seconds.

The illuminance of these actinic ray irradiating sections is preferably from 50 to 500 mW/cm$^2$, more preferably 50 to 150 mW/cm$^2$.

The UV-cured resin layer thus obtained may preferably contain inorganic or organic microparticles in order to conduct preventing blocking, improving scratch resistance, providing an antiglare property or a light diffusing property and optimizing the reflective index.

The hard coat layer of the present invention preferably contains inorganic microparticles, examples of which include, for example: silicon oxide, titanium oxide, aluminum oxide, zirconium oxide, magnesium oxide, calcium carbonate, talc, clay, calcined kaolin, calcined calcium silicate, hydrated calcium silicate, aluminum silicate, magnesium silicate and calcium phosphate. Among these, silicon oxide, titanium oxide, aluminum oxide, zirconium oxide, magnesium oxide are specifically preferable.

Organic microparticles include, for example: microparticles of polymethacrylic acid methyl acrylate resin, acryl styrene based resin, polymethyl methacrylate resin, silicon based resin, polystyrene based resin, polycarbonate resin, benzoguanamine based resin, melamine based resin, polyolefin based resin, polyester based resin, polyamide based resin, polyimide based resin and polyfluorinated ethylene based resin. Specifically preferable organic microparticles include, for example: microparticles of cross-linked polystylene (such as SX-130H, SX-200H and SX-350H manufactured by Soken Chemical & Engineering Co., Ltd.) and polymethyl methacrylate (such as MX150 and MX300 manufactured by Soken Chemical & Engineering Co., Ltd.).

The primary average particle diameter of the microparticles is preferably from 0.005 to 5 μm and specifically preferably from 0.01 to 3 μm. It may be preferable to contain two or more kinds of particles different in primary average particles size and refractive index. The primary average particle size can be obtained by the use of a particle size measuring apparatus, such as Multisizer3 (produced by Beckman Coulter Corporation), and ELS-Z2 (produced by Otsuka Electronics Co., Ltd.). In addition, silane coupling agents may be added in the following low-refractive-index layer.

Further, it is desirable that the value of Ra/Sm calculated from the average length Sm of a contour curvilinear element specified by JIS B 0601 is 0.008 or less.

The center-line average roughness (Ra), Sm are preferably measured by means of a optical interference type surface roughness meter, for example, RST/PLUS manufactured by WYKO Co., Ltd.

A UV ray-curable resin layer having a convexo-concave surface is preferably formed by the use of an emboss roll with a convexo-concave surface, and also a UV ray-curable resin layer provided with anti-glare by the formation of convexo-concave on the surface by a ink-jet method or a printing method is preferably employed.

(Back Coat Layer)

The hard coat film of the present invention having a hard coat layer on one surface of the cellulose ester film is preferably provided with a back coat layer on the other surface of the cellulose ester film. A back coat film is provided on a cellulose ester film to prevent curling which may occur when a hard coat layer or other layers are formed on a cellulose ester film by means of a coating method or by CVD. Namely, by adding a counter force to curl toward the back coat side, the force to curl toward the hard coat layer side may be balanced out. Also, a back coat layer preferably has a feature to prevent blocking. For this purpose, microparticles (fine particles) are preferably added to a coating composition of back coat layer.

Microparticles preferably added to the back coat layer include inorganic microparticles, for example, silicon dioxide, titanium dioxide, aluminum oxide, zirconium oxide, calcium carbonate, talc, clay, calcined kaolin, calcined calcium silicate, tin oxide, indium oxide, zinc oxide, ITO, hydrated calcium silicate, aluminum silicate, magnesium silicate and calcium phosphate. Microparticles containing silicon are preferably used to minimize the haze. Of the above, silicon dioxide is specifically preferable.

Examples of the inorganic microparticles available on the market include: AEROSIL R972, R927V, R974, R812, 200, 200V, 300, R202, OX50 and TT600 (manufacture by Nippon Aerosil Co. Ltd.), KEP-10 KEP-30, and KEP-50 (manufacture by Nippon Shokubai Co. Ltd.). Examples of the microparticles of zirconium oxide available on the market include: AEROSIL R976 and R811 (manufacture by Nippon Aerosil Co. Ltd). Examples of the microparticles of polymer include: silicone resin, fluorine resin and acryl resin. Among these, silicone resin, especially three dimensionally mesh-structured silicone resin is preferably used. Examples of silicone resins available on the market include TOSPERL 103, 105, 108, 120, 145, 3120 and 240 (manufactured by Toshiba Silicone Co., Ltd.).

Among the microparticles listed above, AEROSIL 200V and AEROSIL R972V are particularly preferable with respect to effectively preventing blocking while minimizing haze. The kinetic friction coefficient of the rear side of the hard coat layer in the present invention is preferably 0.9 or less and specifically preferably from 0.1 to 0.9.

The content of microparticles contained in the back coat layer is preferably from 0.1 to 50 percent by weight and more preferably from 0.1 to 10 percent by weight. The increase in haze after the hard coat film is provided with a back coat layer is preferably 1 percent or less, more preferably 0.5 percent or less and specifically preferably from 0.0 to 0.1 percent.

The back coat layer is formed by means of a coating method using a coating solution containing a solvent which dissolves and/or swells cellulose ester. The solvent may occasionally be comprised of a solvent which does not dissolve nor swell cellulose ester. The mixing ratio of these solvents and the amount of the coating solution to be used for forming a back coat layer is appropriately determined depending on the extent of the curl and the type of the resin used for the hard coat film.

In order to enhance a curl preventing function, it is effective to increase the mixing ratio of a solvent capable of dissolving the used solvent compositions or the mixing ratio of a solvent capable of swelling and to decrease the ratio of a solvent incapable of dissolving. The mixing ratio is preferably such that (a solvent capable of dissolving and/or a solvent capable of swelling):(a solvent incapable of dissolving)=10:0 to 1:9. Examples of the solvent capable of dissolving or swelling a transparent resin film include: dioxane, acetone, methyl ethyl ketone, N,N-dimethyl formamide, methyl acetate, ethyl acetate, trichloroethylene, methylene chloride, ethylene chloride, tetrachloroethane, trichloroethane and chloroform. Examples of the solvent incapable of dissolving include: methanol, ethanol, n-propyl alcohol, i-propyl alcohol, n-butanol and hydrocarbons (such as toluene, xylene and cyclohexane).

The back coat layer is coated by means of, for example: a gravure coater, a dip coater, a reverse coater, a wire-bar coater and a die coater, in a thickness of preferably from 1 to 100 μm and specifically preferably from 5 to 30 μm. Resins utilized as a binder in a back coat layer include, for example: vinyl type homopolymers or copolymers such as a vinyl chloride/vinyl acetate copolymer, a vinyl chloride resin, a vinyl acetate resin, a copolymer of vinyl acetate and vinyl alcohol, a partially hydrolyzed vinyl chloride/vinyl acetate copolymer, a vinyl chloride/vinylidene chloride copolymer, a vinyl chloride/acrylonitrile copolymer, an ethylene/vinyl alcohol copolymer, a chlorinated polyvinylchloride, an ethylene/vinyl chloride copolymer and a ethylene/vinyl acetate copolymer, cellulose derivatives such as cellulose nitrate, cellulose acetate propionate (preferably acetyl group substitution degree of 1.8 to 2.3, propionyl group substitution degree of 0.1 to 1.0), cellulose diacetate, cellulose triacetate, cellulose acetate phthalate and cellulose acetate butylate; rubber type resins such as a copolymer of maleic acid and/or acrylic acid, a copolymer of acrylate ester, an acrylonitrile/stylene copolymer, a chlorinated polyethylene, an acrylonitrile/chlorinated polyethylene/stylene copolymer, a methylmethacrylate/butadiene/stylene copolymer, an acryl resin, a polyvinylacetal resin, a polyvinylbutyral resin, a polyester polyuretane resin, a polyether polyurethane resin, a polycarbonate polyurethane resin, a polyester resin, a polyether resin, a polyamide resin, an amino resin, a stylene/butadiene resin and a butadiene/acrilonitrile resin; a silicone type resin; and a fluorine type resin, however, the present invention is not limited thereto Examples of acryl resins available on the market include homopolymers and copolymers produced from acryl or methacryl monomers, such as: Acrypet MD, VH, MF and V (manufactured by Mitsubisi Rayon Co., Ltd.), Hi Pearl M-4003, M-4005, M-4006, M-4202, M-5000, M-5001 and M-4501 (Negami Chemical Industrial Co., Ltd.), Dianal BR-50, BR-52, BR-53, BR-60, BR-64, BR-73, BR-75, BR-77, BR-79, BR-80, BR-82, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117 and BR-118 (manufactured by Mitsubisi Rayon Co., Ltd.). A resin used in the present invention may suitably be selected from the above examples.

Cellulose type resin such as diacetyl cellulose and cellulose acetate propionate is specifically preferable. Further, into the following low refractive index layer, a surfactant such as fluorine type surfactant may be added.

The coating order of a back coat layer on a cellulose ester film is not specifically limited, namely, a back coat layer may be formed before or after forming the layers on the opposite surface (hard coat layer and other layers such as antistatic layer), however, when a back coat layer also functions as an antiblocking layer, the back coat layer is preferably formed before the opposite side layers. Coating of a back coat layer may preferably be divided in two or more times.

(Antireflection Layer)

Next, an antireflection layer according to the present invention will be explained.

In the present invention, as surprising effects, by laminating at least a low refractive index layer or a plurality of layers such as a low refractive index layer and a high refractive index layer as an antireflection layer on a specific hard coat layer, the chemical resistance, surface hardness, moisture and heat resistance, adhesion, abrasion resistance, coating properties, and cracking resistance of this antireflection layer have been improved remarkably.

First, a high refractive index layer (or medium refractive index layer) desirable to the present invention is explained.

(High Refractive Index Layer (or Medium Refractive Index Layer))

(Metal Oxide Particles of High Refractive Index Layer (or Medium Refractive Index Layer))

Metal oxide particles are contained in a high refractive index layer according to the present invention. The type of metal oxide particles is not specifically limited and utilized can be metal oxide provided with at least one element selected from Ti, Zr, Sn, Sb, Cu, Fe, Mn, Pb, Cd, As, Cr, Hg, Zn, Al, Mg, Si, P and S; and these metal oxide particles may be doped with a tiny amount of an atom of such as Al, In, Sn, Sb, Nb, a halogen element and Ta. Further, mixtures thereof can be also utilized. In the present invention, particularly, preferably utilized as a primary component are metal oxide particles of one type selected from zirconium oxide, antimony oxide, tin oxide, zinc oxide, indium tin oxide (ITO), tin oxide doped with antimony (ATO) and zinc antimonate and specifically preferable is indium tin oxide (ITO).

An average particle diameter of primary particles of these metal oxide particles is preferably in a range of 10-200 nm and specifically preferably in a range of 10-150 nm. An average primary particle diameter of metal oxide particles is determined through observation with an electron microscope, for example, a scanning electron microscope (SEM). The average primary particle diameter of metal oxide particles may also be determined using a particle diameter analyzer via a dynamic light scattering method or a static light scattering method. When the particle diameter is less than 10 nm, aggregation is liable resulting in deteriorating dispersibility. While, when the particle diameter exceeds 200 nm, haze is extremely increased, and it is unfavorable. The shape of metal oxide particles is preferably a rice grain form, a spherical form, a cubic form, a corn form, a needle form or an irregular form.

In particular, a refractive index of a high refractive index layer is preferably higher than that of transparent substrate film as a support and in a range of 1.50-1.70, based on measurement at 23° C. with a wavelength of 550 nm. Since means to adjust a refractive index of a high refractive-index layer are primarily the type of metal oxide particles and the addition amount, a refractive index of metal oxide particles is preferably 1.80-2.60 and more preferably 1.85-2.50.

Metal oxide particles may be surface treated with an organic compound. By modifying the surface of metal oxide particles with at organic compound, dispersion stability in an organic solvent is improved and control of a dispersed particle diameter becomes easy as well as it is also possible to restrain aggregation and precipitation due to aging. Therefore, the amount of surface modification with an organic compound is 0.1-5 weight % and more preferably 0.5-3 weight %, against metal oxide particles. Specific examples of an organic substance utilized for the surface treatment include polyol, alkanol amine, stearic acid, a silane coupling agent and a titanate coupling agent. Among them, a silane coupling agent described later is preferred. Two or more types of surface treatments may be utilized in combination.

A thickness of a high refractive index layer containing the aforesaid metal oxide particles is preferably 5 nm-1 µm, more preferably 10 nm-0.2 µm and most preferably 30 nm-0.1 µm.

The ratio of metal oxide particles utilized in the antireflection film to a binder such as ionizing radiation curable resin described later differs depending on such as the type and particle diameter of metal oxide particles, however, the ratio is preferably approximately 1/2-2/1 based on a volume ratio of the former to the latter.

The used amount of metal oxide particles utilized in the present invention is preferably 5-85 weight % in a high refractive index layer, more preferably 10-80 weight % and most preferably 20-75 weight %. If the used amount is small, the desired refractive index or the effect of the present invention may not be obtained, on the other hand, If the used amount is too much, the deterioration of the film strength may occur.

The above-described metal oxide particles are supplied to a coating solution, which forms a high refractive index-layer, in a state of dispersion being dispersed in a medium. As a dispersion medium of metal oxide particles, preferable is a liquid having a boiling point of 60-170° C. Specific examples of a dispersion medium include water, alcohol (such as methanol, ethanol, isopropanol, butanol and benzylalcohol), ketone (such as acetone, methyl ethyl ketone, methyl isobutyl ketone and cyclohexanone), ketone alcohol (such as diacetone alcohol), ester (such as methyl acetate, ethyl acetate, propyl acetate, butyl acetate, methyl formate, ethyl formate, propyl formate and butyl formate), aliphatic hydrocarbon (such as hexane and cyclohexane), hydrocarbon halogenide (such as methylene chloride, chloroform and carbon tetrachloride), aromatic hydrocarbon (such as benzene, toluene and xylene), amide (such as dimethylformamide, dimethylacetamide and n-methylpyrrolidone), ether (such as diethyl ether, dioxane and tetrahydrofuran) and ether alcohol (such as 1-methoxy-2-propanol). Among them, toluene, xylene, methyl ethyl ketone, methyl isobutyl ketone, cyclohexanone and butanol are specifically preferable.

Further, metal oxide particles can be dispersed in a medium by use of a homogenizer. Examples of a homogenizer include a sand grinder mill (for example, a beads mill equipped with a pin), a high speed impeller mill, a baffle mill, a roller mill, an atliter and a colloidal mill. A sand grinder mill and a high speed impeller mill are specifically preferable. Further, a preliminary dispersion may be performed. Examples of a homogenizer utilized in a preliminary dispersion include a ball mill, a three-roll mill, a kneader and an extruder.

In the present invention, further, metal oxide particles having a core/shell structure may be incorporated. One layer of a shell may be formed on the circumference of a core or plural layers of shells may be formed to further improve light resistance. It is preferable to completely cover the core with a shell.

As a core, utilized can be titanium oxide (such as a rutile type, an anatase type and an amorphous type), zirconium oxide, zinc oxide, cerium oxide, indium oxide doped with tin and tin oxide doped with antimony, however, titanium oxide of a rutile type is preferably utilized as a primary component.

A shell preferably utilizes an inorganic compound other than titanium oxide as a primary component and is formed from metal oxide or metal sulfide. For example, inorganic compounds comprised of such as silicon dioxide (silica), aluminum oxide (alumina), zirconium oxide, zinc oxide, tin oxide, antimony oxide, indium oxide, iron oxide and zinc sulfide as a primary component can be utilized. Among them, preferably utilized are alumina, silica and zirconia (zirconium oxide). Further, mixtures thereof are also preferable.

The coverage of a shell against a core is 2-50 weights, preferably 3-40 weight % and furthermore preferably 4-25 weight %, based on a mean coverage. When the coverage of a shell is large, refractive index of particles will decrease, while when the coverage is excessively small, light resistance will be deteriorated. Two or more types of inorganic particles may also be utilized in combination.

As titanium oxide to form a core, one prepared by a liquid phase method or a gas phase method can be utilized. Further, as a method to form a shell around a core, utilized can be a method described in such as U.S. Pat. No. 3,410,708, Examined Japanese Patent Application Publication No. 58-47061, U.S. Pat. Nos. 2,885,366 and 3,437,502, British Patent No. 1,134,249, U.S. Pat. No. 3,383,231, British Patent Nos. 2,629,953 and 1,365,999.

(Metal Compound)

As metal compounds utilized in the present invention, compounds represented by following Formula (2) or chelate compounds thereof can be utilized.

$$A_n MB_{x-n} \qquad \text{Formula (2)}$$

wherein, M represents a metal atom, A represents a functional group which can be hydrolyzed, or a hydrocarbon group provided with a functional group which can be hydrolyzed, and B represents an atomic group which has made a covalent or ionic bond with metal atom M. x represents a valence of metal atom M and n represents an integer of not less than 2 and not more than x.

A functional group A capable of being hydrolyzed includes such as an alkoxy group, a halogen atom such as chlorine atom, an ester group and an amido group. Metal compounds belonging to above formula (2) include alkoxide provided with at least two alkoxy groups, which directly bond to the metal atom, or chelate compounds thereof. Preferable metal compounds include titanium alkoxide, zirconium alkoxide or chelate compounds thereof. Titanium alkoxide gives a rapid reaction rate and a high refractive index as well as easy handling, however, it may deteriorate light resistance due to the photocatalitic function when a large amount thereof is added. Zirconium alkoxide has a high refractive index; however, since it is liable to be milky-whitened, care should be taken of such as dew point control at the time of coating. Further, since titanium alkoxide has an effect to accelerate the reaction of ultraviolet curable resin and metal alkoxide, it is possible to improve physical properties of coated film even with a small amount of addition.

Examples of titanium alkoxide includes: tetramethoxy titanium, tetraethoxy titanium, tetra-iso-propoxy titanium, tetra-n-propoxy titanium, tetra-n-butoxy titanium, tetra-sec-butoxy titanium and tetra-tert-butoxy titanium.

Examples of zirconium alkoxide includes: tetramethoxy zirconium, tetraethoxy zirconium, tetra-iso-propoxy zirconium, tetra-n-propoxy zirconium, tetra-n-butoxy zirconium, tetra-sec-butoxy zirconium and tetra-tert-butoxy zirconium.

A preferable chelating agent, which forms a chelate compound by coordinating to a metal compound, includes alkanol amines such as diethanol amine and triethanol amine; glycols such as ethylene glycol, diethylene glycol and propylene glycol; acetylacetone and ethyl acetoacetate; having a molecular weight of not more than 10,000. By utilizing these chelating agents, a chelate compound, which is stable against such as mixing of water content and excellent in a bolstering effect of coated layer, can be formed.

The additive amount of a metal compound is preferably adjusted to 0.3-5 weight % based on the content of metal oxide arising from said metal compound contained in a high refractive index layer. Scratch resistance is not sufficient when the content is less than 0.3 weight %, while light resistance tends to be deteriorated when the content is over 5 weight %.

(Ionization Radiation Curable Resin)

Ionization radiation curable resin is added as a binder for metal oxide particles to improve film forming capability and physical properties of coated film. As ionization radiation curable resin, utilized can be monomer or oligomer provided with at least two functional groups which generate a polymerization reaction directly with irradiation of ionization radiation such as ultraviolet rays and electron rays or indirectly with a function of a photo-polymerization initiator. The functional group includes a group having an unsaturated double bond such as a (meth)acryloyloxy group, an epoxy group and silanol group. Among them, radical polymerizing monomer or oligomer which has at least two unsaturated double bonds is preferably utilized A photopolymerization initiator may be appropriately employed in combination. Such ionization radiation curable resin includes a polyfunctional acrylate compound, and preferably is a compound selected from a group comprising pentaerythritol polyfunctional acrylate, dipentaerythritol polyfunctional acrylate, pentaerythritol polyfunctional methacrylate and dipentaerythritol polyfunctional methacrylate. Herein, a polyfunctional acrylate compound is a compound provided with at least two acryloyloxy groups and/or methacryloyloxy groups.

Examples of a monomer of a polyfunctional acrylate compound include: ethylene glycol diacrylate, diethylene glycol diacrylate, 1,6-hexanediol diacrylate, neopentyl glycol diacrylate, trimethylolpropane triacrylate, trimethylolethane triacrylate, tetramethylolmethane triacrylate, tetramethylolmethane tetraacrylate, pentaglycelol triacrylate, pentaerythritol diacrylate, pentaerythritol triacrylate, pentaerythritol tetraacrylate, glycerin triacrylate, dipentaerythritol triacrylate, dipentaerythritol tetraacrylate, dipentaerythritol pentaacrylate, dipentaerythritol hexaacrylate, tris(acryloyloxyethyl) isocyanulate, ethylene glycol dimethacrylate, diethylene glycol dimethacrylate, 1,6-hexanediol dimethacrylate, neopentyl glycol dimethacrylate, trimethylolpropane trimethacrylate, trimethylolethane trimethacrylate, tetramethylolmethane trimethacrylate, tetramethylolmethane tetramethacrylate, pentaglycelol trimethacrylate, pentaerythritol dimethacrylate, pentaerythritol trimethacrylate, pentaerythritol tetramethacrylate, glycerin trimethacrylate, dipentaerythritol trimethacrylate, dipentaerythritol tetramethacrylate, dipentaerythritol pentamethacrylate and dipentaerythritol hexamethacrylate. These compounds each are utilized alone or in combination of at least two types. Further, oligomer such as dimmer or trimer of the above-described monomer may also be utilized.

The addition amount of ionization radiation curable resin is preferably not less than 15 weight % and not more than 50 weight % in the solid content, in case of a high refractive index composition.

To accelerate curing of ionization radiation curable resin according to the present invention, it is preferable to incorporate a photo-polymerization initiator and an acrylic compound having two or more unsaturated bonds, which is capable of polymerization, in a molecule, at a weight ratio of 3:7-1:9.

Specific examples of a photo-polymerization initiator include: acetophenone, benzophenone, hydroxybenzophenone, Michler's ketone, α-amyloxime ester and thioxanthone; and derivatives thereof, however, the photo-polymerization initiator is not limited thereto.

(Solvent)

Examples of an organic solvent utilized for coating of a high refractive index layer of the present invention include: alcohols (such as methanol, ethanol, propanol, isopropanol, butanol, isobutanol, secondary butanol, tertiary butanol, pentanol, hexanol, cyclohexanol and benzyl alcohol), polyhydric alcohols (such as ethylene glycol, diethylene glycol, triethylene glycol, polyethylene glycol, propylene glycol, dipropylene glycol, polypropylene glycol, butylenes glycol, hexanediol, pentanediol, glycerin, hexanetriol and thiodiglycol), polyhydric alcohol ethers (such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, ethylene glycol monophenyl ether and propylene glycol monophenyl ether), amines (such as ethanol amine, diethenol amine, triethenol amine, N-methyl diethanol amine, N-ethyl diethanol amine, morpholine, N-ethyl morpholine, ethylene diamine, diethylene diamine, triethylene tetramine, tetraethylene pentamine, polyethylene imine, pentamethyldiethylene triamine and tetramethylpropylene diamine), amides (such as formamide, N,N-dimethyl formamide and N,N-dimethyl acetoamide), heterocyclic rings (such as 2-pyrrolidone, N-methyl-2-pyrrolidone, cyclohexyl pyrrolidone, 2-oxazoline and 1,3-dimethyl-2-imidazolidinone), sulfoxides (such as dimethylsulfoxide), sulfones (such as sulforane), urea, acetonitrile and acetone, however, alcohols, polyhydric alcohols and polyhydric alcohol ethers are specifically preferred.

For the high refractive index layer described above, a medium refractive index layer can be similarly formed by adjustment of the content of metal oxide particles, etc.

<Low Refractive Index Layer>

The refractive index of the low refractive index layer used for the present invention is lower than that of a transparent resin film being a support, it is 23° C., and wavelength measurement of 550 nm, and it is desirable that it is in a range of 1.30 to 1.45.

The layer thickness of the low refractive index layer is desirably 5 nm to 0.5 μm, more desirably 10 nm to 0.3 μm, and still more desirably 30 nm to 0.2 μm.

The low refractive index layer forming composition utilized in the antireflection film of the present invention contains an organosilicon compound, which is represented by Formula (3), a hydrolyzed product thereof or a polycondensation product thereof and hollow silica particles having an outer shell and porous or vacant inside.

  Formula (3)

(wherein, R represents an alkyl group and preferably an alkyl group having 1-4 carbon atoms)

In addition to this, a solvent and appropriately such as a silane coupling agent, a hardener and a surfactant may be incorporated.

(Hollow Silica Particles)

Hollow silica particles, the interior of which is porous or hollow, provided with an outer shell layer represented by aforesaid (e), will now be explained.

Hollow silica particles are (I) complex particles constituted of a porous particle and a cover layer arranged on the surface of said porous particle or (II) hollow particles, the interior of which is hollow and the hollow is filled with contents such as a solvent, a gas or a porous substance. Herein, at least either (I) complex particles or (II) hollow particles is contained in a low refractive index layer, or the both of them may be contained.

Herein, hollow particles are particles the interior of which is hollow, and the hollow is surrounded by a particle wall. The interior of the hollow is filled with the contents such as a solvent, a gas or a porous substance which have been utilized in preparation. The mean particle diameter of such hollow particles is preferably in a range of 5-300 nm and preferably of 10-200 nm. The mean particle diameter of hollow particles utilized is appropriately selected depending on the thickness of the formed transparent cover film and is preferably in a range of 2/3-1/10 of the layer thickness of the transparent cover film of such as a formed low refractive index layer. These hollow particles are preferably utilized in a state of being dispersed in a suitable medium to form a low refractive index layer. As dispersing medium, water, alcohol (such as methanol, ethanol and isopropanol), ketone (such as methyl ethyl ketone and methyl isobutyl ketone) and ketone alcohol (such as diacetone alcohol) are preferable.

A thickness of the cover layer of a complex particle or the thickness of the particle wall of a hollow particle is preferably in a range of 1-20 nm and more preferably in a range of 2-15 nm. In the case of a complex particle, when a thickness of the cover layer is less than 1 nm, a particle may not be completely covered to allow such as silicate monomer or oligomer having a low polymerization degree as a coating component described later to immerse into the interior of the complex particle resulting in decrease of porousness of the interior, whereby an effect of a low refractive index may not be obtained. Further, when a thickness of the cover layer is over 20 nm, the aforesaid silicate monomer or oligomer never immerses into the interior, however, the porosity (fine pore volume) of a complex particle may be decreased, resulting in an insufficient effect of a low refractive index. Further, in the case of a hollow particle, particle shape may not be kept when a thickness of the particle wall is less than 1 nm, while an effect of a low refractive index may not be obtained when a thickness of the particle wall is not less than 20 nm.

The cover layer of a complex particle or the particle wall of a hollow particle is preferably comprised of silica as a primary component. Further, components other than silica may be incorporated and specific examples include such as $Al_2O_3$, $B_2O_3$, $TiO_2$, $ZrO_2$, $SnO_2$, $CeO_2$, $P_2O_5$, $Sb_2O_3$, $MoO_3$, $ZnO_2$, and $WO_3$. A porous particle to constitute a complex particle includes those comprised of silica, those comprised of silica and an inorganic compound other than silica and those comprised of such as $CaF_2$, NaF, $NaAlF_6$ and MgF. Among them, specifically preferable is a porous particle comprised of a complex oxide of silica and an inorganic compound other than silica. An inorganic compound other than silica includes one type or at least two types of such as $Al_2O_3$, $B_2O_3$, $TiO_2$, $ZrO_2$, $SnO_2$, $CeO_2$, $P_2O_5$, $Sb_2O_3$, $MoO_3$, $ZnO_2$ and $WO_3$. In such a porous particle, mole ratio $MO_x/SiO_2$ is preferably in a range of 0.0001-1.0 and more preferably of 0.001-0.3 when silica is represented by $SiO_2$ and an inorganic compound other than silica is represented by an equivalent oxide ($MO_x$). A porous particle having mole ratio $MO_x/SiO_2$ of less than 0.0001 is difficult to be prepared and the pore volume is small to unable preparation of a particle having a low refractive index. Further, when mole ratio $MO_x/SiO_2$ of a porous particle is over 1.0, the pore volume becomes large due to a small ratio of silica and it may be further difficult to prepare a particle having a low refractive index.

A pore volume of such a porous particle is preferably in a range of 0.1-1.5 ml/g and more preferably of 0.2-1.5 ml/g. When the pore volume is less than 0.1 ml/g, a particle having a sufficiently decreased refractive index cannot be prepared, while, when it is over 1.5 ml/g, strength of a particle is decreased and strength of the obtained cover film may be decreased.

Herein, the pore volume of such a porous particle can be determined by a mercury pressurized impregnation method. Further, a content of a hollow particle includes such as a solvent, a gas and a porous substance which have been utilized at preparation of the particle. In a solvent, such as a non-reacted substance of a particle precursor which is utilized at hollow particle preparation and a utilized catalyst may be contained. Further, a porous substance includes those comprising compounds exemplified in the aforesaid porous particle. These contents may be those containing single component or mixture of plural components.

As a manufacturing method of such hollow particles, a preparation method of complex oxide colloidal particles, disclosed in paragraph Nos. [0010]-[0033] of JP-A No. 7-133105, is suitably applied. Specifically, in the case of a complex particle being comprised of silica and an inorganic compound other than silica, the hollow particle is manufactured according to the following first-third processes.

First Process: Preparation of Porous Particle Precursor

In the first process, alkaline aqueous solutions of a silica raw material and of an inorganic compound raw material other than silica are independently prepared or a mixed aqueous solution of a silica raw material and an inorganic compound raw material other than silica is prepared, in advance, and this aqueous solution is gradually added into an alkaline aqueous solution having a pH of not less than 10 while stirring depending on the complex ratio of the aimed complex oxide, whereby a porous particle precursor is prepared.

As a silica raw material, silicate of alkali metal, ammonium or organic base is utilized. As silicate of alkali metal, utilized are sodium silicate (water glass) and potassium silicate. Organic base includes quaternary ammonium salt such as tetraethylammonium salt; and amines such as monoethanolamine, diethanolamine and triethanolamine. Herein, an alkaline solution, in which such as ammonia, quaternary ammonium hydroxide or an amine compound is added to a silicic acid solution, is also included in silicate of ammonium or silicate of organic base.

Further, as a raw material of an inorganic compound other than silica, utilized is an alkali-soluble inorganic compound. Specific examples include oxoacid of an element selected from such as Al, B, Ti, Zr, Sn, Ce, P, Sb, Mo, Zn and W; alkali metal salt, alkaline earth metal salt, ammonium salt and quaternary ammonium salt of said oxoacid. More specifically, sodium alminate, sodium tetraborate, ammonium zirconyl carbonate, potassium antimonite, potassium stannate, sodium alminosilicate, sodium molybdate, cerium ammonium nitrate and sodium phosphate are suitable.

The pH value of a mixed aqueous solution changes simultaneously with addition of these aqueous solutions, however, operation to control the pH value into a specific range is not necessary. The aqueous solution finally takes a pH value determined by the types and the mixing ratio of inorganic oxide. At this time, the addition rate of an aqueous solution is not specifically limited. Further, dispersion of a seed particle may be also utilized as a starting material at the time of manufacturing of complex oxide particles. Said seed particles are not specifically limited, however, particles of inorganic oxide such as $SiO_2$; $Al_2O_3$, $TiO_2$ or $ZrO_2$ or complex oxide thereof are utilized, and generally sol thereof can be utilized. Further, a porous particle precursor dispersion prepared by the aforesaid manufacturing method may be utilized as a seed particle dispersion. In the case of utilizing a seed particle dispersion, after the pH of a seed particle dispersion is adjusted to not lower than 10 an aqueous solution of the aforesaid compound is added into said seed particle dispersion while stirring. In this case pH control of dispersion is not necessarily required. By utilizing seed particles in this manner, it is easy to control the particle diameter of prepared particles and particles having a uniform size distribution can be obtained.

A silica raw material and an inorganic compound raw material, which were described above, have a high solubility at alkaline side. However, when the both are mixed in pH range showing this high solubility, the solubility of an oxoacid ion such as a silicic acid ion and an aluminic acid ion will decrease, resulting in precipitation of these complex products to form particles or to be precipitated on a seed particle causing particle growth. Therefore, at the time of precipitation and growth of particles, pH control in a conventional method is not necessarily required.

A complex ratio of silica and an inorganic compound other than silica in the first process is preferably in a range of 0.05-2.0 and more preferably of 0.2-2.0, based on mole ratio $MO_x/SiO_2$, when an inorganic compound other than silica is converted to oxide ($MO_x$). In this range, the smaller is the ratio of silica, increases the pore volume of porous particles. However, a pore volume of porous particles barely increases even when the mole ratio is over 2.0. On the other hand, a pore volume becomes small when the mole ratio is less than 0.05. In the case of preparing hollow particles, mole ratio of $MO_x/SiO_2$ is preferably in a range of 0.25-2.0.

Second Process: Removal of Inorganic Compounds Other than Silica from Porous Particles In the second process, at least a part of inorganic compounds other than silica (elements other than silica and oxygen) is selectively removed from the porous particle precursor prepared in the aforesaid first process. As a specific removal method, inorganic compounds in a porous particle precursor are dissolved and removed by use of such as mineral acid and organic acid, or by being contacted with cationic ion-exchange resin.

Herein, a porous particle precursor prepared in the first process is a particle having a network structure in which silica and an inorganic compound element bond via oxygen. In this manner, by removing inorganic compounds (elements other than silica and oxygen) from a porous particle precursor, porous particles, which are more porous and have a large pore volume, can be prepared. Further, hollow particles can be prepared by increasing the removal amount of inorganic compound (elements other than silica and oxygen) from a porous particle precursor.

Further, in advance to removal of inorganic compounds other than silica from a porous particle precursor, it is preferable to form a silica protective film by adding a silicic acid solution which contains a silane compound having a fluorine substituted alkyl group, and is prepared by dealkalization of alkali metal salt of silica; or a hydrolyzable organosilicon compound, in a porous particle precursor dispersion prepared in the first process. The thickness of a silica protective film is 0.5-15 nm. Herein, even when a silica protective film is formed, since the protective film in this process is porous and has a thin thickness, it is possible to remove the aforesaid inorganic compounds other than silica from a porous particle precursor.

By forming such a silica protective film, the aforesaid inorganic compounds other than silica can be removed from a porous particle precursor while keeping the particle shape as it is. Further, at the time of forming a silica cover layer described later, the pore of porous particles is not blocked by a cover layer, and thereby the silica cover layer described later can be formed without decreasing the pore volume. Herein, when the amount of inorganic compound to be removed is small, it is not necessary to form a protective film because the particles will never be broken.

Further, in the case of preparation of hollow particles, it is preferable to form this silica protective film. At the time of preparation of hollow particles, a hollow particle precursor, which is comprised of a silica protective film, a solvent and insoluble porous solid within said silica protective film, is obtained when inorganic compounds are removed, and hollow particles are formed, by making a particle wall from a formed cover layer, when the cover layer described later is formed on said hollow particle precursor.

The amount of a silica source added to form the aforesaid silica protective film is preferably in a range to maintain the particle shape. When the amount of a silica source is excessively large, it may become difficult to remove inorganic compounds other than silica from a porous particle precursor because a silica protective film becomes excessively thick. As a hydrolizable organosilicon compound utilized to form a silica protective film, alkoxysilane represented by formula $R_n Si(OR')_{4-n}$ [R, R': a hydrocarbon group such as an alkyl group, an aryl group, a vinyl group and an acryl group; n=0, 1, 2 or 3] can be utilized. Fluorine-substituted tetraalkoxysilane, such as tetramethoxysilane, tetraethoysilane and tetraisopropoxysilane, is specifically preferably utilized.

As an addition method, a solution, in which a small amount of alkali or acid as a catalyst is added into a mixed solution of these alkoxysilane, pure water and alcohol, is added into the aforesaid dispersion of porous particles, and silicic acid polymer formed by hydrolysis of alkoxysilane is precipitated on the surface of inorganic oxide particles. At this time, alkoxysilane, alcohol and a catalyst may be simultaneously added into the dispersion. As an alkali catalyst, ammonia, hydroxide of alkali metal and amines can be utilized. Further, as an acid catalyst, various types of inorganic acid and organic acid can be utilized.

In the case that a dispersion medium of a porous particle precursor is water alone or has a high ratio of water to an organic solvent, it is also possible to form a silica protective film by use of a silicic acid solution. In the case of utilizing a silicic acid solution, a predetermined amount of a silicic acid solution is added into the dispersion and alkali is added simultaneously, to precipitate silicic acid solution on the porous particle surface. Herein, a silica protective film may also be formed by utilizing a silicic acid solution and the aforesaid alkoxysilane in combination.

Third Process: Formation of Silica Cover Layer

In the third process, by addition of such as a hydrolyzable organosilicon compound containing a silane compound provided with a fluorine substituted alkyl group, or a silicic acid solution, into a porous particle dispersion (into a hollow particle dispersion in the case of hollow particles), which is prepared in the second process, the surface of particles is covered with a polymer substance of such as a hydrolyzable organosilicon compound or a silicic acid solution to form a silica cover layer.

As a hydrolyzable organosilicon compound utilized for formation of a silica cover layer, alkoxysilane represented by formula $R_n Si(OR')_{4-n}$ [R, R': a hydrocarbon group such as an alkyl group, an aryl group, a vinyl group and an acryl group; n=0, 1, 2 or 3], as described before, can be utilized. Tetraalkoxysilane such as tetramethoxysilane, tetraethoxysilane and tetraisopropoxysilane are specifically preferably utilized.

As an addition method, a solution, in which a small amount of alkali or acid as a catalyst is added into a mixed solution of these alkoxysilane, pure water and alcohol, is added into the aforesaid dispersion of porous particles (a hollow particle precursor in the case of hollow particles), and silicic acid polymer formed by hydrolysis of alkoxysilane is precipitated on the surface of porous particles (a hollow particle precursor in the case of hollow particles). At this time, alkoxysilane, alcohol and a catalyst may be simultaneously added into the dispersion. As an alkali catalyst, ammonia, hydroxide of alkali metal and amines can be utilized. Further, as an acid catalyst, various types of inorganic acid and organic acid can be utilized.

In the case that a dispersion medium of porous particles (a hollow particle precursor in the case of hollow particles) is water alone or a mixed solution of water with an organic solvent having a high ratio of water to an organic solvent, it is also possible to form a cover layer by use of a silicic acid solution. A silicic acid solution is an aqueous solution of lower polymer of silicic acid which is formed by ion-exchange and dealkalization of an aqueous solution of alkali metal silicate such as water glass.

A silicic acid solution is added into a dispersion of porous particles (a hollow particle precursor in the case of hollow particles), and alkali is simultaneously added to precipitate silicic acid lower polymer on the surface of porous particles (a hollow particle precursor in the case of hollow particles). Herein, silicic acid solution may be also utilized in combination with the aforesaid alkoxysilane to form a cover layer. The addition amount of an organosilicon compound or a silicic acid solution, which is utilized for cover layer formation, is as much as to sufficiently cover the surface of colloidal particles and the solution is added into a dispersion of porous particles (a hollow particle precursor in the case of hollow particles) at an amount to make a thickness of the finally obtained silica cover layer of 1-20 nm. Further, in the case that the aforesaid silica protective film is formed, an organosilicon compound or a silicic acid solution is added at an amount to make a thickness of the total of a silica protective film and a silica cover layer of 1-20 nm.

Next, a dispersion of particles provided with a cover layer is subjected to a thermal treatment. By a thermal treatment, in the case of porous particles, a silica cover layer, which covers the surface of porous particles, becomes minute to prepare a dispersion of complex particles comprising porous particles covered with a silica cover layer. Further, in the case of a hollow particle precursor, the formed cover layer becomes minute to form a hollow particle wall, whereby a dispersion of hollow particles provided with a hollow, the interior of which is filled with a solvent, a gas or a porous solid, is prepared.

Thermal treatment temperature at this time is not specifically limited provided being so as to block micro-pores of a silica cover layer, and is preferably in a range of 80-300° C. At a thermal treatment temperature of lower than 80° C., a silica cover layer may not become minute to completely block the micro-pores or the treatment time may become long. Further, when a prolonged treatment at a thermal treatment temperature of higher than 300° C. is performed, particles may become minute and an effect of a low refractive index may not be obtained.

A refractive index of inorganic particles prepared in this manner is as low as less than 1.42. It is assumed that the refractive index becomes low because such inorganic particles maintain porous property in the interior of porous particles or the interior is hollow.

A content of hollow silica particles, the interior of which is porous or hollow, in a low refractive index layer is preferably 10-50 weight % The content is preferably not less than 15 weight % to obtain an effect of a low refractive index, and a binder component become small to give insufficient layer strength when the content is over 50 weight %. The content is specifically preferably 20-50 weight %.

(Organosilicon Compound Represented by Formula (3) or its Hydrolysate, or its Polycondensation)

With respect to an organosilicon compound represented by aforesaid Formula (3), R in the formula represents an alkyl group having a carbon number of 1-4.

Specifically, tetraalkoxysilane such as tetramethoxysilane, tetraethoxysilane and tetraisopropoxysilane is preferably utilized.

As an addition method into a low refractive index layer, a solution, in which a small amount of alkali or acid as a catalyst is added into a mixed solution of these alkoxysilane, pure water and alcohol, is added into the aforesaid dispersion of hollow silica type particles, and silicic acid polymer formed by hydrolysis of alkoxysilane is precipitated on the surface of hollow silica type particles. At this time, alkoxysilane, alcohol and a catalyst may be simultaneously added into the dispersion. As an alkali catalyst, ammonia, hydroxide of alkali metal and amines can be utilized. Further, as an acid catalyst, various types of inorganic acid and organic acid can be utilized.

As a metal chelate, alkoxide such as aluminium, titanium, and zirconium, or chelate compounds, is listed. Examples of these chelate compounds include, zirconium chelate compounds, such as tri-n-butoxyethylacetoacetate zirconium, di-n-butoxybis(ethylacetoacetate) zirconium, n-butoxytris(ethylacetoacetate) zirconium, tetra-kis(n-propylacetoacetate) zirconium, tetra-kis(acetylacetoacetate) zirconium, and tetra-kis(ethylacetoacetate) zirconium; titanium chelate compounds, such as diisopropoxy bis(ethylacetoacetate) titanium, diisopropoxy bis(acetyl acetate) titanium and diisopropoxy bis(acetyl acetone) titanium; and aluminum chelate compound, such as diisopropoxy ethylacetoacetate aluminium, diisopropoxy acetylacetonato aluminium, isopropoxy bis(ethylacetoacetate) aluminum, isopropoxy bis(acetylacetonato) aluminium, tris(ethylacetoacetate) aluminium, tris(acetylacetonato) aluminium, and mono-acetylacetonato bis(ethylacetoacetate) aluminium. Among these metal chelate compounds, desirable one may be tri-n-butoxyethylacetoacetate zirconium, diisopropoxy bis(acetylacetonato) titanium, diisopropoxy ethylacetoacetate aluminium, and tris(ethylacetoacetate) aluminium. These metal chelate compounds may be used solely with one kind or used as a mixture of two or more kinds. Further, the partial hydrolysate of these metal chelate compounds may also be used. The metal chelate compounds may be used with a rate of preferably 0.01 to 40% by weight, more preferably 0.1 to 30% by weight, still more preferably 0.5 to 10% by weight to the organosilicon compound represented by General formula (3); $Si(OR)_4$.

Further, in the present invention, silane compounds containing a fluorine substituted alkyl group, which are represented by following Formula (4), can also be incorporated in a low refractive index layer.

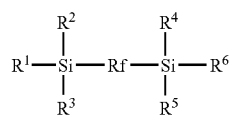

Formula (4)

Silane compounds containing a fluorine substituted alkyl group, which are represented by aforesaid Formula (3), will be now explained.

In the formula, $R^1$-$R^6$ represent an alkyl group having a carbon number of 1-16 and preferably of 1-4, a halogenated alkyl group having a carbon number of 1-6 and preferably of 1-4, an aryl group having a carbon number of 6-12 and preferably of 6-10, an alkylaryl group and an arylalkyl group, having a carbon number of 7-14 and preferably of 7-12, an alkenyl group having a carbon number of 2-8 and preferably of 2-6, an alkoxy group having a carbon number of 1-6 and preferably of 1-3, hydrogen atom or a halogen atom.

Rf represents —$(C_aH_bF_c)$—, "a" represents an integer of 1-12, "b+c" is "2a", and "b" and "c" each represent 0 or an integer of 1-24. As such Rf, a group, provided with a fluoroalkylene group and a alkylene group, is preferable. Specifically, such a fluorine-containing silicone compound includes such as methoxysilane compounds represented by $(MeO)_3SiC_2H_4C_2F_4C_2H_4Si(MeO)_3$, $(MeO)_3SiC_2H_4C_4F_8C_2H_4Si(MeO)_3$, $(MeO)_3SiC_2H_4C_6F_{12}C_2H_4Si(MeO)_3$, $(H_5C_2O)_3SiC_2H_4C_4F_8C_2H_4Si(H_5C_2O)_3$ and $(H_5C_2O)_3SiC_2H_4C_6F_{12}C_2H_4Si(H_5C_2O)_3$.

When a silane compound provided with a fluorine-containing alkyl group is incorporated as a binder, since the formed transparent film it self is provided with hydrophobicity, invasion by water content or chemicals such as acid and alkali into the transparent film is restrained even when the transparent film is not made sufficiently minute to be porous or have cracks or voids. Further, particles such as metal contained in the substrate surface or the underlying conductive layer will never react with water content or chemicals such as acid and alkali. Therefore, such transparent film is provided with an excellent chemical resistance.

Further, when a silane compound provided with a fluorine-containing alkyl group is incorporated as a binder, sliding property in addition to such hydrophobicity is excellent (contact resistance is low), therefore transparent film having an excellent scratch strength can be obtained. Further, when a binder contains a silane compound provided with a fluorine-containing alkyl group having such a constituent unit, it is possible to form transparent film having an excellent adhesion with a conductive layer, in the case of a conductive layer being arranged under the film, because shrinkage ratio of the binder is same as or nearly equal to that of the conductive layer. Further, at the time of thermal treatment of transparent film, a conductive layer will never peeled off due to difference of shrinkage rate to generate a portion without electrical contact in a transparent conductive layer. Therefore, sufficient conductivity as the whole film can be maintained.

Transparent film containing a silane compound provided with a fluorine-containing alkyl group, and hollow silica particles the interior of which is porous or hollow, provided with the aforesaid outer layer, can form transparent film having an excellent strength, such as film strength evaluated based on eraser strength or nail strength in addition to a strong scratch strength, as well as a high pencil hardness.

A silane coupling agent may be incorporated in a low refractive index layer according to the present invention. A silane coupling agent includes methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-glycidyloxypropyltrimethoxysilane, γ-glycidyloxypropyltriethoxysilane, γ-(β-glycidyloxyethoxy)propyltrimethoxysilane, β-(3,4-epoxycyclohexyl)ethyltrimethoxysilane, β-(3,4-epoxycyclohexyl)ethyltriethoxysilane, γ-acryloyloxypropyltrimethoxysilane, γ-methacryloyloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-β-(aminoethyl)-γ-aminopropyltrimethoxysilane and β-cyanoethyltriethoxysilane.

Further, examples of a silane coupling agent having two alkyl substituents against silicon include: dimethyldimethoxysilane, phenylmethyldimethoxysilane, dimethyldiethoxysilane, phenylmethyldiethoxysilane, γ-glycidyloxypropylmethyldiethoxysilane, γ-glycidyloxypropylphenyldiethoxysilane, γ-chloropropylmethyldiethoxysilane, dimethyldiacetoxysilane, γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane and methylvinyldiethoxysilane.

Among them, vinylmethoxysilane, vinyltriethoxysilane, vinyltriacethoxysilane, vinyltrimethoxyethoxysilane, γ-acryloyloxypropyltrimethoxysilane and γ-methacryloyloxypropyltrimethoxysilane, which are provided with a double bond in a molecule; γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, methylvinyldimethoxysilane and methylvinyldiethoxysilane as those having a 2-substituting alkyl group against silicon are preferable; and γ-acryloyloxypropyltrimethoxysilane, γ-methacryloyloxypropyltrimethoxysilane, γ-acryloyloxypropylmethyldimethoxysilane, γ-acryloyloxypropylmethyldiethoxysilane, γ-methacryloyloxypropylmethyldimethoxysilane and γ-methacryloyloxypropylmethyldiethoxysilane are specifically preferable.

Two or more coupling agents may be utilized in combination. Other silane coupling agents in addition to the above-described silane coupling agents may be utilized. Other silane coupling agents include alkyl ester of orthosilicic acid (such as methyl orthosilicate, ethyl orthosilicate, n-propyl orthosilicate, i-propyl orthosilicate, n-butyl orthosilicate, sec-butyl orthosilicate and t-butyl orthosilicate) and hydrolyzed substances thereof.

Polymer utilized as another binder in a low refractive index layer includes such as polyvinyl alcohol, polyoxyethylene, polymethyl methacrylate, polymethyl acrylate, diacetyl cellulose, triacetyl cellulose, nitro cellulose, polyester and alkyd resin.

A low refractive index layer preferably contains a binder of 5-80 weight % as a whole. A binder is provided with a function to unite hollow silica particles and to maintain the structure of a low refractive index layer-containing voids. The using amount of a binder is adjusted so as to maintain strength of a low refractive index layer without filling voids.

(Solvent)

A low refractive index layer according to the present invention preferably contains an organic solvent. Specific examples of an organic solvent include alcohol (such as methanol, ethanol, isopropanol, butanol and benzyl alcohol), ketone (such as acetone, methyl ethyl ketone, methyl isobutyl ketone and cyclohexanone), ester (such as methyl acetate, ethyl acetate, propyl acetate, butyl acetate, methyl formate, ethyl formate, propyl formate and butyl formate), aliphatic hydrocarbon (such as hexane and cyclohexane), halogenated hydrocarbon (such methylene chloride, chloroform and tetrachlorometane), aromatic hydrocarbon (such as benzene, toluene and xylene), amide (such as dimethyl formamide, dimethyl acetoamide and n-methylpyrrolidone), ether (such as diethyl ether, dioxane and tetrahydrofuran) and ether alcohol (such as 1-methoxy-2-propanol). Among them, specifically preferable are toluene, xylene, methyl ethyl ketone, methyl isobutyl ketone, cyclohexanone and butanol.

A solid concentration in a low refractive index layer coating composition is preferably 1-4 weight %, and uneven coating is hardly caused by setting said solid concentration to not more than 4 weigh % as well as a drying load is decreased by setting the concentration to not less than 1 weight %.

(Fluorine-containing Surfactant, Silicone Oil or Silicone Surfactant)

In the present invention, a fluorine-containing surfactant, silicone oil or a silicone surfactant is preferably incorporated in the aforesaid hard coat layer, high refractive index layer and low refractive index layer. By containing the above-described surfactant, it is effective to restrain uneven coating and to improve antistaining property of the film surface.

Fluorine-containing surfactants are those comprising monomer, oligomer and polymer containing a perfluoroalkyl group, as a mother nucleus, and include derivatives of such as polyoxyethylene alkylether, polyoxyethylene alkylallylehter and polyoxyethylene.

As a fluorine-containing surfactant, products available on the market can be also utilized, and listed are Surflon "S-381", "S-382", "SC-101", "SC-102" "SC-103" and "SC-104" (all are manufactured by Asahi Glass Co., Ltd.); Fluorad "FC-430", "FC-431" and "FC-173" (all are manufactured by Fluoro Chemical-Sumitomo 3M Co., Ltd.); Eftop (fluoro surfactant) "EF352", "EF301" and "EF303" (all are manufactured by Shin-Akita Chemicals Co., Ltd. (JEMCO Inc.)); Schwego-Fluor "8035" and "8036" (all are manufacture by Schwegmann Co., Ltd.); "BM1000" and "BM1100" (all are manufactured B. M. Chemie Corp.) and Megafac "F-171" and "F-470" (all are manufactured by Dainippon Ink and Chemicals, Inc.).

A fluorine content ratio of a fluorine-containing surfactant in the present invention is 0.05-2% and preferably 0.1-1%. The above-described fluorine-containing surfactants may be utilized alone or in combination of at least two types, and may be utilized in combination with other surfactants.

Silicone oil or a silicone surfactant will now be explained.

Among them, preferably added is polyether modified silicone oil. The number average molecular weight of polyether modified silicone oil is, for example, 1,000-100,000 and preferably 2,000-50,000. Drying property of film is decreased when the number average molecular weight is less than 1,000, while there is a tendency of hardly causing bleed out on the film surface when the number average molecular weight is over 100,000.

Specific products include such as L-45, L-9300, FZ-3704, FZ-3703; FZ-3720, FZ-3786, FZ-3501, FZ-3504, FZ-3508, FZ-3705, FZ-3707, FZ-3710, FZ-3750, FZ-3760, FZ-3785, FZ-3785 and Y-7499 of Nippon Unicar Co., Ltd; and KF-96L, KF-96, KF-96H, KF-99, KF-54, KF-965, KF-968, KF-56, KF-995, KF-351, KF-351A, KF-352, KF-353, KF-354, KF-355, KF-615, KF-618, KF-945, KF-6004 and FL100 of Shin-Etsu Chemical Co., Ltd.

Next, examples of the silicone surfactant include the before mentioned compounds. Among them, preferable is a compound with a structure having dimethylpolysiloxane as a nonionic hydrophobic group.

When a nonionic surfactant constituted of dimethylpolysiloxane as a hydrophobic group and polyoxyalkylene as a hydrophilic group is used, unevenness in the low refractive index layer is decreased and antistaining property of the film surface is improved. It is considered that a hydrophobic group constituted of polysiloxane is oriented on the surface to form a film surface being hardly stained.

Specific examples of these nonionic surfactants include such as silicone surfactants SILWET L-77, L-720, L-7001, L-7002, L-7604, Y-7006, FZ-2101, FZ-2104, FZ-2105, FZ-2110, FZ-2118, FZ-2120, FZ-2122, FZ-2123, FZ-2130, FZ-2154, FZ-2161, FZ-2162, FZ-2163, FZ-2164, FZ-2166 and FZ-2191, manufactured by Nippon Unicar Co., Ltd.

Further, listed are such as SUPERSILWET SS-2801, SS 2802, SS-2803, SS-2804 and SS-2805.

Further, a structure of a nonionic type surfactant, which is constituted of dimethylpolysiloxane as a hydrophobic group and polyoxyalkylene as a hydrophilic group, is preferably block copolymer of a straight chain form in which a dimethylpolysiloxane portion and a polyoxyethylene chain are alternately and repeatedly bonded. It is superior because of a long chain length of the primary chain structure and the straight chain form structure. It is considered because one surfactant can absorb on the surface of a silica particle to cover said particle at plural portions since the surfactant is a block copolymer which is comprised of a hydrophilic group and a hydrophobic group alternately repeating.

Specific examples thereof include such as silicone surfactants ABN SILWET FZ-2203, FZ-2207 and FZ-2208, manufactured by Nippon Unicar Co., Ltd.

Other surfactants may be utilized in combination, and appropriately utilized in combination are anionic surfactants of such as a sulfonate type, a sulfate ester type and a phosphate ester type; and nonionic surfactants of such as an ether type and an ether ester type which are provided with a polyoxyetylene chain as a hydrophilic group.

In the present invention, it is desirable that the content of a silicone surfactant (silicone oil) in the high refractive index layer and in the low refractive index layer is 0.05 to 2.0% by weight.

(Formation of an Antireflection Layer)

In the present invention, although a method of providing an antireflection layer is not limited-specifically, each of a method of forming by coating is desirable. On the hard coat layer surface, each layer of antireflection layers is formed by coating with a dip coating method, an air knife coating method, a curtain coating method, a roller coating method, a wire bar coating method, a gravure coating method, a micro gravure coating method, or an extrusion coating method.

Especially, it is preferable that a hard coat layer is formed by coating on one surface of a transparent resin film and then the film is wound up into a roll form, and thereafter, the film is wound out again from the roll form and an antireflection layer is formed on this hard coat layer by coating. Here, the hard coat layer and the antireflection layer may be formed continuously. However, when the film is wound up into a roll form after a hard coat layer is coated on the film, the surface of the hard coat layer is sufficiently unstiffened and the effect to improve the trouble at the time of coating an antireflection layer may be expectable.

Further, it may be also preferable to apply a surface treatment for the hard coat layer before coating an antireflection layer. As the surface treatment, a cleaning process, an alkali treatment process, a flame plasma treatment process, a high frequency discharge plasma process, an electron beam process, an ion beam process, a sputtering process, an acid treatment process, a corona treatment process, an atmospheric pressure glow discharge plasma process, etc. may be listed, and preferable are an alkali treatment process and a corona treatment process, and more preferable is an alkali treatment process.

Furthermore, it is desirable to apply a heat treatment for the antireflection film of the present invention after coating a high refractive index layer (or medium refractive index layer) and a low refractive index layer. Concrete examples of the heat treatment include is not specifically limited. However, it is desirable that after an antireflection layer is laminated on a transparent resin film, a heat treatment is conducted at 50 to 150° C. for 1 to 30 days on the state that the film is wound up into a roll form.

(Physicality of Antireflection Layer)

The reflectance of antireflection film according to the present invention can be measured by a spectrophotometer. At this time, the back surface of the measurement side of a sample is subjected to a light absorption treatment by use of a black colored spray after having been embossing treated, and reflective light in a visible light region (400-700 nm) is measured. The reflectance is preferably as low as possible, however, the mean reflectance in wavelengths of a visible light region is preferably not more than 1.5% and the minimum reflectance is preferably not more than 0.8%. Further, it is preferable to have a flat reflection spectrum in a visible light wavelength region. Here, in the film, if the average value of reflectance in a wavelength of the visible light region (400-700 nm) is 115% or less, it can be deemed that the film has an antireflection layer.

Further, the polarizing plate surface having been subjected to an antireflection treatment often has a reflection hue of red or blue because reflectance of shorter wavelengths or longer wavelengths in a visible light region is increased due to design of antireflection film, however, a desire with respect to a color tone of reflective light may differ depending on the application. In the case of the outermost surface of a FPD television, a neutral tone is required. In this case, the reflection hue generally preferred is $0.17 \leq x \leq 0.27$ and $0.07 \leq y \leq 0.17$, on XYZ color specification system (CIE1931 color specification system).

The thickness of a high refractive index layer and a low refractive index layer is obtained by calculation in accordance with an ordinary method in consideration of reflectance by the refractive index of each layer and the color tone of reflected light.

(Transparent Resin Film)

Next, a transparent resin film used in the present invention is explained to details.

As a requirement for a transparent resin film used in the present invention, to be easy in a production, to have a good adhesive property with a hard coat layer, to be optically isotropy and to be transparent optically are listed.

Transparency, as described in the present invention, refers to visible light transmittance of 60 percent or more, preferably 80 percent or more, and most preferably 90 percent or more.

The transparent resin film is not particularly limited as long as the films exhibit the aforesaid properties. Examples include cellulose ester based film, polyester based film, polycarbonate based film, polyallylate based film, polysulfone (including polyestersulfone) based film, polyester film containing polyethylene terephthalate or polyethylene naphthalate, polyethylene film, polypropylene film, cellophane, cellulose diacetate film, cellulose triacetate film, cellulose acetate propionate film, cellulose acetate butyrate film, polyvinylidene chloride film, polyvinyl alcohol film, ethylene vinyl alcohol film, cyndioctatic polystyrene based film, polycarbonate film, cycloolefin polymer film (Arton, manufactured by JSR Co.), Zeonex and Zeonare (both manufactured by Zeon Corp.), polymethylpentane film, polyether ketone film, polyether ketoneimide film, polyamide film, fluorine resin film, nylon film, polymethyl methacrylate film, acryl film, or glass plates. Of these, preferred are cellulose triacetate film, polycarbonate film, and polysulfone (including polyethersulfone) film. In the present invention, from the viewpoint of production, cost, transparency, isotropy, and adhesion property, preferably employed is cellulose ester film (e.g., Konica Minolta Tac, a trade name, KC8UX2MW, KC4UX2MW, KC8UY, KC4UY, KC5UN, KC12UR, KC8UCR-3, KC8UCR-4 and KC8UCR-5 manufactured by Konica Minolta Opto, Inc.). These films may be film produced by melt-casting type film formation or film produced by solution-casting type film formation.

In the present invention, as a transparent resin film, cellulose ester based film is preferably used. As cellulose ester, preferably used are cellulose acetate, cellulose acetate butyrate and cellulose acetate propionate, cellulose acetate butyrate film, of these, more preferably used are cellulose acetate butyrate, cellulose acetate naphthalate and cellulose acetate propionate.

Specifically, when X represents the degree of substitution of an acetyl group, while Y represent the degree of substitution of a propionyl group or a butyryl group, a transparent substrate film containing a mixed aliphatic acid ester of cellulose having X and Y in the below ranges can be preferably employed.

$$2.3 \leq X+Y \leq 3.0$$

$$0.1 \leq Y \leq 1.5$$

Especially, $2.5 \leq X+Y \leq 2.9$, $0.3 \leq Y \leq 1.2$ are more preferable.

Cellulose as a source material of the cellulose ester of the present invention is not specifically limited, however, usable are cotton linter, wood pulp (obtained from acicular trees or from broad leaf trees) or kenaf. The cellulose esters obtained from these cellulose source materials may also be used by mixing with each other in any ratio. In case, an acid anhydride (acetic anhydride, propionic anhydride, and butyric anhydride) is used as an acylation agent, cellulose ester can be prepared through a common reaction using an organic acid such as acetic acid and an organic solvent such as methylene chloride, in the presence of a protic catalyst such as sulfuric acid.

When an acylation agent is an acid chloride ($CH_3COCl$, $C_2H_5COCl$ or $C_3H_7COCl$), a reaction is carried out using a basic compound such as an amine as a catalyst. Specifically, the reaction can be carried out according to the method disclosed in JP-A No. 10-45804. The cellulose ester used in the present invention is obtained through a reaction using in combination of the above acylation agents depending on the acylation degree. In an acylation reaction to form a cellulose ester, an acyl group reacts with the hydroxyl group of a cellulose molecule. A cellulose molecule is made up of many glucose units connected each other, and a glucose unit contains three hydroxyl groups. The number of hydroxyl groups substituted by acyl groups in a glucose unit is referred to as a degree of acetyl substitution. For example, in the case of cellulose triacetate, all the three hydroxyl groups in one glucose unit are substituted by acetyl groups (practically: 2.6-3.0). With regard to the substitution degree for hydroxyl groups at second, third, sixth positions, if the hydroxyl groups are substituted averagely, the substitution degree of the sixth position may be high or low, that is, any case may be preferably used.

The cellulose ester used for the present invention is not specifically limited, however, preferably employed are mixed tatty acid esters of cellulose in which a propionate group or a butyrate group is bonded to cellulose in addition to an acetyl group, for example, cellulose acetate propionate, cellulose acetate butyrate or cellulose acetate propionate butyrate. The butyryl group which forms butyrate may be linear or branched.

Cellulose acetate propionate which contains a propionate group as a substituent is excellent in water resistance, and useful as a film for a liquid crystal display.

An acyl substitution degree can be determined through a method prescribed in ASTM-D817-96.

The number average molecular weight of cellulose ester is desirably 70000-250000, because a mechanical strength at the time of shaping becomes strong, and a dope solution becomes proper viscosity, and more desirably 80000-150000.

The cellulose ester is preferably produced by a method generally called as a solution casting film forming method in which a cellulose ester solution (dope solution) is cast (casting) onto a casting supporter such as an endless metal belt transported infinitely or a rotating metal drum casting) of the dope solution, and carrying out film production through a pressure die.

As an organic solvent used for preparing these dope solutions, it may be desirable for the organic solvent to be able to dissolve cellulose ester and to have a moderate boiling point, for example, methylene chloride, methyl acetate, ethylacetate, amyl acetate, methyl acetoacetate, acetone, tetrahydrofuran, 1,3-dioxolane, 1,4-dioxane, cyclohexanone, ethyl formate, 2,2,2-trifluoro ethanol, 2,2,3,3-tetrafluoro-1-propanol, 1,3-difluoro-2-propanol, 1,1,1,3,3, and 3-hexafluoro-2-methyl-2-propanol, Although 1,1,1,3,3, and 3-hexafluoro-2-propanol, 2,2,3 and 3, and 3-pentafluoro-1-propanol, nitroethane, 1, and 3-dimethyl-2-imidzolinon etc. may be employed, however, organic halogenated compounds, such as methylene chloride, a dioxysolan derivative, methyl acetate, an ethylacetate, acetone, methyl acetoacetate, etc. may be listed up as a desirable organic solvent (namely, good solvent).

Further, as shown in the following film-production process, when drying a solvent from the web (dope solution film) formed on a casting support in a solvent evaporation process, from a viewpoint of preventing foaming in the web, as a boiling point of the organic solvent used, 30 to 80° C. is desirable, for example, the boiling point of the above-mentioned good solvents are methylene chloride (40.4° C. of boiling points), methyl acetate (56.32° C. of boiling points), acetone (56.3° C. of boiling points), an ethylacetate (76.82° C. of boiling points), etc.

Among the above-mentioned good solvents, methylene chloride or methyl acetate which is excellent in solubility may be used preferably.

In a dope used in the present invention, 0.1 to 40% by weight of alcohol having a carbon number of 1 to 4 is preferably added in addition to the above described organic solvent. In particular, the above alcohol is preferably contained in an amount of 5 to 30% by weight. When alcohol is contained in a web, after casting a dope on a support and the solvent being partially evaporated from the web, the relative concentration of alcohol becomes higher and the web begins to gelate. The gelation increases the mechanical strength of the web and makes it easier to peel the web from the support. A smaller concentration of alcohol in a dope may contribute to increase a solubility of cellulose ester in a non-chlorine based organic solvent.

Typical alcohols of 1 to 4 carbon atoms (per molecule) are methanol, ethanol, n-propanol, iso-propanol, n-buthanol, sec-buthanol, and tert-buthanol.

Among these solvents, ethanol is desirable, because the stability of a dope solution is preferable, a boiling point is also comparatively low, drying characteristics are also preferable, and there is no toxicity. It is desirable to use preferably a solvent which contains ethanol 5% by mass to 30% by mass to 70% by mass to 95% by mass of methylene chloride. Methyl acetate can also be used instead of methylene chloride. At this time, a dope solution may be prepares with a cooling solution process.

In the case that a cellulose ester film is used for an antireflection film of the present invention, it is desirable to contain the following plasticizers. As the plasticizers, for example, a phosphate type plasticizers, a multivalent alcohol ester type plasticizer, a phthalate ester type plasticizer, a trimellitic acid ester type plasticizer, a pyromellitic acid type plasticizer, a glycolate type plasticizer, a citrate ester type plasticizer, a polyester type plasticizer, a fatty acid ester type plasticizer, a polycarboxylic-acid ester type plasticizer, etc. can be used preferably.

Among them, a multivalent alcohol ester type plasticizer, a phthalate ester type plasticizer, a citrate ester type plasticizer, a tatty acid ester type plasticizer, a glycolate type plasticizer, a polycarboxylic-acids ester type plasticizer, etc. are desirable. Especially, a multivalent alcohol ester type plasticizer is desirably used, because the pencil hardness of 4 H or more can be obtained stably for a hard coat layer.

A multivalent alcohol ester type plasticizer is a plasticizer composed of an ester of an aliphatic polyalcohol having a valence of two or more and monocarboxylic acid, and preferably includes an aromatic ring or a cycloalkyl ring in a molecule. It is preferably aliphatic series multivalent alcohol ester of 2 to 20 valent.

A polyalcohol used in the present invention is represented by Formula (1)

$$R_1-(OH)_n \quad \text{Formula (1)}$$

(Here, $R_1$ represents an organic acid having a valence of n, n represents a positive integer of 2 or more, and an OH group represents an alcoholic and/or phenolic hydroxyl group.)

Examples of a preferable polyalcohol are listed below, however, the present invention is not limited thereto: adonitol, arabitol, ethylene glycol, diethylene glycol, triethylene glycol, tetraethylene glycol, 1,2-propanediol, 1,3-propanediol, dipropylene glycol, a tripropylene glycol, 1,2-butanediol, 1,3-butanediol, 1,4-butanediol, dibutyleneglycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol, etc. can be listed. In particular, triethylene glycol, tetraethylene glycol, dipropylene glycol, a tripropylene glycol, sorbitol, trimethylolpropane, and xylitol are desirable.

A mono carboxylic acid to be used for the polyalcohol ester is not specifically limited, and well known compounds such as aliphatic monocarboxylic acid, alicyclic monocarboxylic acid and aromatic monocarboxylic acid may be used. Alicyclic monocarboxylic acid or aromatic monocarboxylic acid is preferably used with respect to improving moisture permeability and retention of additives.

Examples of preferable monocarboxylic acids are listed below, however, the present invention is not limited thereto.

For aliphatic monocarboxylic acids, normal or branched fatty acids having from 1 to 32 carbon atoms are preferably used. The number of carbon atoms is more preferably from 1 to 20 and still more preferably from 1 to 10. The use of an acetic acid will help improve the mutual solubility, so that a mixture of an acetic acid and other monocarboxylic acids is also preferable.

Examples of preferable aliphatic mono carboxylic acids include saturated fatty acids such as: acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, linoleic acid, linolenic acid and arachidonic acid.

Examples of preferable alicyclic monocarboxylic acids include: cyclopentanecarboxylic acid, cyclohexanecarboxylic acid, cyclooctanecarboxylic acid, and derivatives thereof.

Examples of preferable aromatic monocarboxylic acids include: benzoic acid and toluic acid, both of which have benzene ring in which alkyl groups are introduced, biphenylcarboxylic acid, naphthalenecarboxylic and tetralincarboxylic acid having 2 or more benzene rings, and (derivatives thereof, of these, benzoic acid is specifically preferred.

The molecular weight of the polyalcohol ester is not limited, however, the molecular weight is preferably from 300 to 1,500 and more preferably from 350 to 750. A higher molecular weight is preferable in that the volatility of the polyalcohol is reduced, while a lower molecular weight is preferable with respect to moisture permeability, or to mutual solubility with cellulose ester.

Carboxylic acid to be used for a polyalcohol ester, may be used alone or in combination of two or more carboxylic acids. Hydroxyl groups in a polyalcohol may be completely esterified or only partially esterified remaining unsubstituted hydroxyl groups.

Specific examples of polyalcohol esters are shown below:

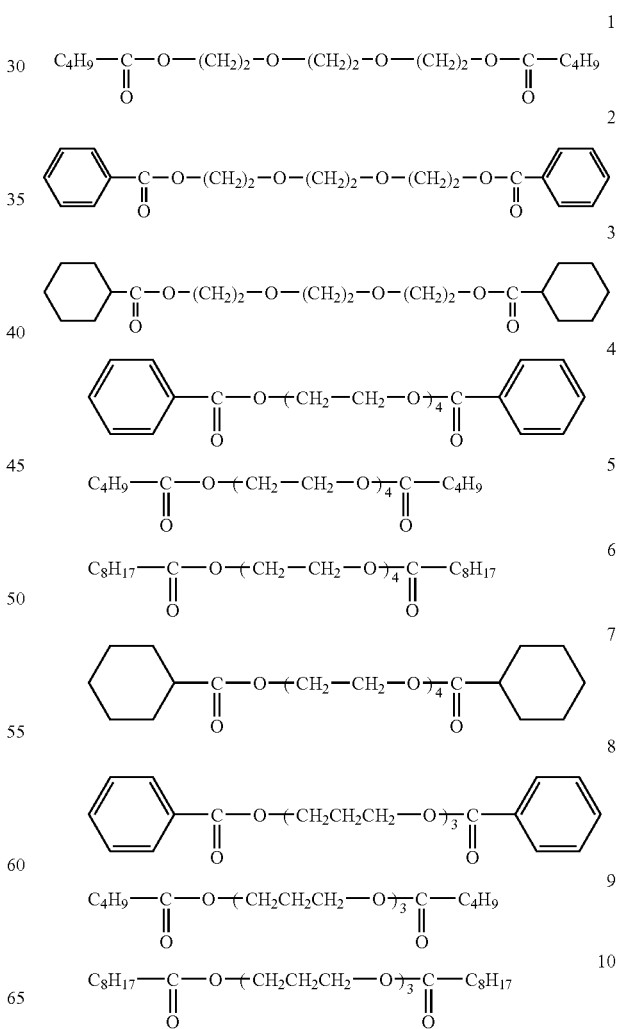

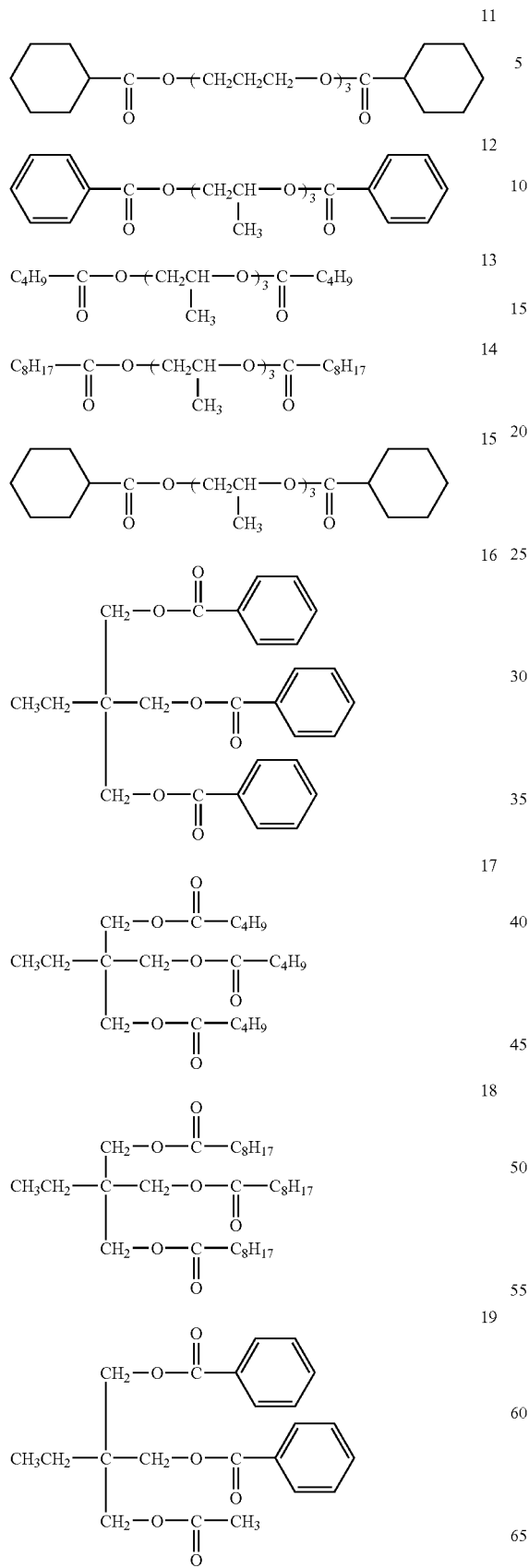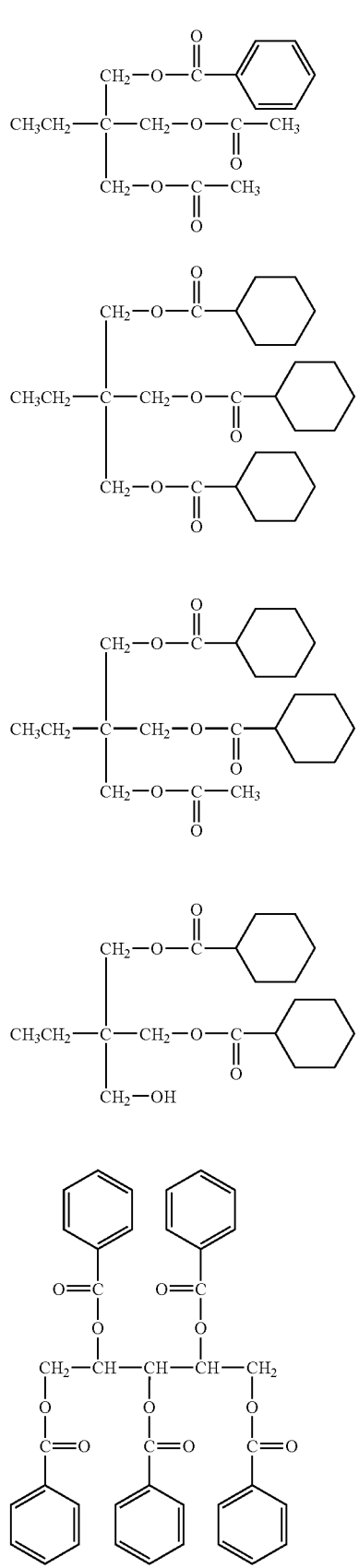

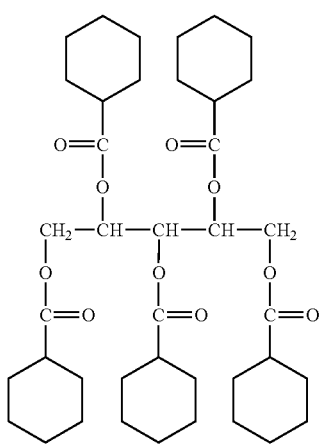
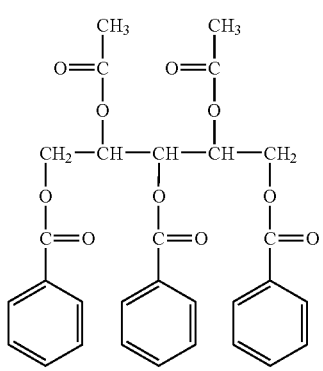
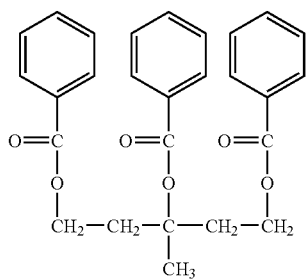
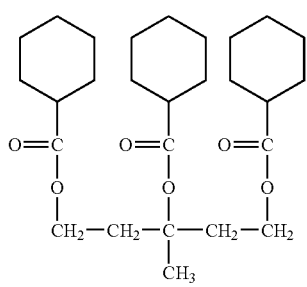
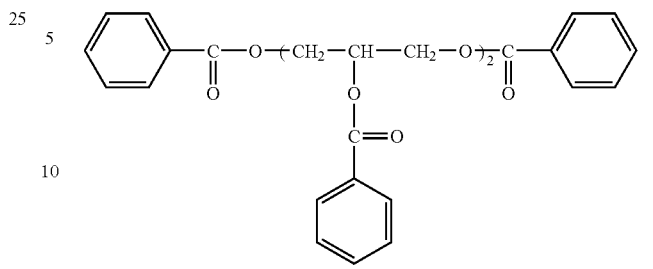
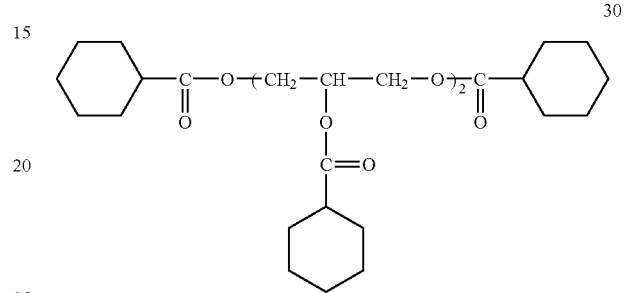
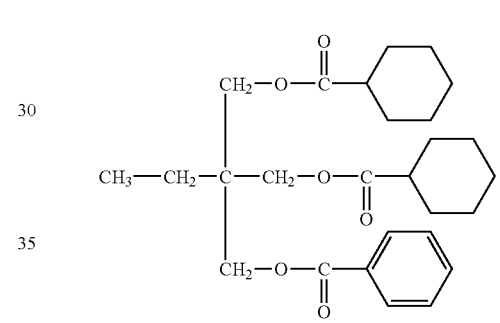
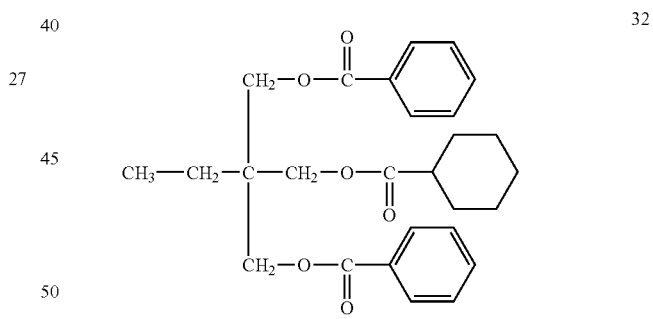
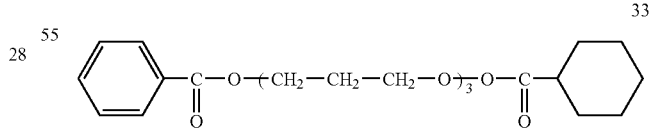
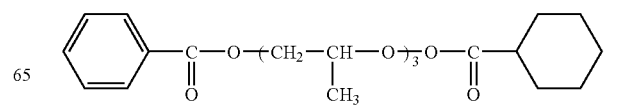

-continued

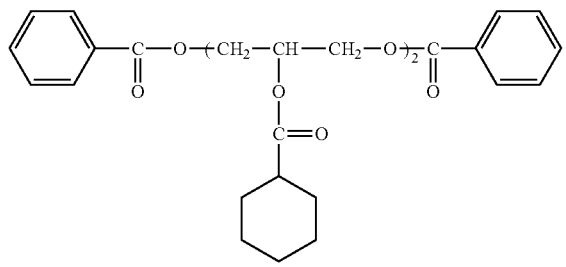

Glycolate plasticizers are not limited specifically, alkylphthalylalkyl glycolates are preferably used. Examples of an alkylphthalylalkyl glycolate include: methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate and octylphthalylethyl glycolate.

Examples of a phthalate plasticizer include: diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate and dicyclohexyl terephthalate.

Examples of a citrate plasticizer include, acetyl citrate trimethyl, acetyl triethyl citrate, acetyl tributyl citrate.

Examples of a fatty acid ester plasticizer include: butyl oleate, methylacetyl ricinoleate and dibutyl sebacate.

The polyvalent carboxylic acid ester plasticizer is also used preferably. To put it more specifically, the polyvalent carboxylic acid ester described in the paragraphs [0015] through [0020] of the Official Gazette of Japanese Patent Tokkai 2002-265639 is preferably added as one of the plasticizers.

As the other plasticizers, a phosphoric ester type plasticizer may be used. The phosphoric ester type plasticizer includes, for example: triphenyl phosphate, tricresyl phosphate, cresylphenyl phosphate, octyldiphenyl phosphate, diphenylbiphenyl phosphate, trioctyl phosphate and tributyl phosphate.

The total content of plasticizers in the cellulose ester film is preferably from 5 to 20 percent by weight based on the total solid portion of the cellulose ester film, more preferably from 6 to 16 percent by weight, and specifically preferably from 8 to 13 percent by weight. The content of each of the two plasticizers is preferably not less than 1 percent by weight and more preferably not less than 2 percent by weight.

The content of the polyalcohol ester type plasticizer is preferably from 1 to 12 percent by weight and specifically preferably from 3 to 11 percent by weight. When an amount of the polyalcohol ester type plasticizer is insufficient, the flatness of the cellulose ester film may be degraded, while, when it is too much, bleeding out may occur. The ratio by weight of the polyalcohol ester type plasticizer to the other plasticizers is preferably in a range of 1:4 to 4:1, more preferably in a range of 1:3 to 3:1. If the additive amount of the plasticizers is too much or too small, it is not preferable, because a film easily deforms.

An ultraviolet (UV) absorber is preferably used for the antireflection film of the present invention.

As a UV absorber, a UV absorber which excels in the absorbing power of ultraviolet rays with a wavelength of 370 nm or less and has few absorption of a visible ray with a wavelength of 400 nm or more is preferably used from a viewpoint of excellent liquid crystal display property.

Examples of a UV absorbing agent preferably used in the present invention include: an oxybenzophenone based compound, a benzotriazol based compound, a salicylic acid ester based compound, a benzophenone based compound, a cyanoacrylate based compound, a triazine based compound and a nickel complex salt.

Examples of benzotriazol based UV absorbing agent will be given below, however, the present invention is not limited thereto.

UV-1: 2-(2'-hydroxy-5'-methylphenyl)benzotriazole

UV-2: 2-(2'-hydroxy-3',5'-di-tert-butylphenyl)benzotriazole

UV-3: 2-(2'-hydroxy-3'-tert-butyl-5'-methylphenyl)benzotriazole

UV-4: 2-(2'-hydroxy-3',5'-di-tert-butylphenyl)-5-chloro benzotriazole

UV-5: 2-(2'-hydroxy-3'-(3",4",5",6"-tetrahydro phthalimidomethyl)-5'-methylphenyl)benzotriazole UV-6: 2,2-methylenebis (4-(1,1,3,3-tetramethylbutyl)-6-(2H-benzotriazole-2-yl)phenol)

UV-7: 2-(2'-hydroxy-3'-tert-butyl-5'-methylphenyl)-5-chlorobenzotriazole

UV-8: 2-(2H-benzotriazole-2-yl)-6-(n- and iso-dodecyl)-4-methylphenol (TINUVIN171, product of Ciba Specialty Chemicals Inc.)

UV-9: Mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl] propionate (TINUVIN109, product of Ciba Specialty Chemicals Inc.)

Specific examples of a benzophenone based compound are shown below, however, the present invention is not limited thereto.

UV-10: 2,4-dihydroxy benzophenone

UV-11: 2,2'-dihydroxy-4-methoxybenzophenone

UV-12: 2-hydroxy-4-methoxy-5-sulfobenzophenone

UV-13: Bis (2-methoxy-4-hydroxy-5-benzoylphenyl methane)

As UV absorbing agent preferably used in the present invention, the benzotriazole or benzophenone type UV absorbing agent is preferably used which has high transparency, and minimizes deterioration of a polarizing plate or a liquid crystal. The benzotriazole type UV absorbing agent is especially preferably used, since it minimizes undesired coloration.

The UV absorbing agent disclosed in JP-A No. 2001-187825 having a distribution coefficient of 9.2 or more provide an improved surface quality of a long roll film and a favorable coating property. Preferable is a UV absorbing agent having a distribution coefficient of 1.0 or more.

A polymer UV absorbing agent (or a UV absorbing polymer) disclosed in Formula (1) or (2) in JP-A No. 6-148430 or Formula (3), (6) or (7) in JP-A No. 2000-156039 is also preferably employable. As a commercially available UV absorbing agent, PUVA-30M (produced by OTSUKA Chemical Co., Ltd.) is cited.

In order to provide a lubricating property to the cellulose ester film of the present invention, usable are the particles which will be described below to be used for a coating layer containing an ionizing radiation curable resin.

<Microparticles or Fine Particles>

The cellulose ester film of the present invention preferably contains microparticles.

Microparticles may be inorganic, for example: silicon dioxide, titanium dioxide, aluminum oxide, zirconium oxide, calcium carbonate, talk, clay, calcined kaolin, calcined calcium silicate, hydrated calcium silicate, aluminum silicate, magnesium silicate or calcium phosphate. Microparticles containing silicon are preferable in respect to decreasing turbidity, and silicon dioxide is specifically preferable.

The mean diameter of primary particles is preferably from 5 to 50 nm, and more preferably from 7 to 20 nm. The particle should preferably exist as an aggregated secondary particle of a diameter from 0.05 to 0.3 μm. The content of the particle in a cellulose ester film is preferably from 0.05 to 1 percent by weight, and is more preferably from 0.1 to 0.5 percent. In a multi-layered cellulose ester film prepared by a co-casting method, a major part of the particles should preferably exist near the surface.

Microparticle of silicon dioxide available on the market include, for example: AEROSIL R972, R927V, R974, R812, 200, 200V, 300, R202, OX50 and TT600 which are manufacture by Nippon Aerosil Co., Ltd.

Microparticles of zirconium oxide available on the market include, for example: AEROSIL R976 and R811 manufacture by Nippon Aerosil Co., Ltd.

Microparticles of polymer available on the market include, for example: silicone resin, fluorine-contained resin and acryl resin. Among these, silicone resin, especially three dimensionally networked silicone resin is preferably used. Examples of silicone resins include: TOSPERL 103, 105, 108, 120, 145, 3120 and 240, which are manufactured by Toshiba Silicone Co., Ltd.

Among the microparticles listed above, AEROSIL 200V and AEROSIL R972V are particularly preferable with respect to exhibiting a lower friction coefficient while the low turbidity is maintained. Kinetic friction coefficient of the rear side of a hard coat layer in the present invention is preferably not more than 1.0.

(Production Method of a Cellulose Ester Film)

Next, a production method of a cellulose ester film is explained to details.

The production method of a cellulose ester film is conducted by a preparing process to dissolve cellulose ester and addition agents, such as the above-mentioned plasticizer in a solvent and to prepare a dope solution, a casting process to cast the dope solution on a metal base support in a shape of a drive belt or a drum, a drying process to dry the cast dope solution as a web, a peeling process to peel a film from the metal base support, a stretching process to stretch, a drying process to dry further, a heat treating process to heat-treats the obtained film further, and a winding process to wind up a finished film.

In the dope preparing step, a higher content of cellulose ester in the dope is preferable since duration of the drying step following the flow-casting step is shortened, however, a too high content may result in loss of filtration accuracy. Preferable content of cellulose ester is from 10 to 35 percent by weight and more preferably from 15 to 25 percent.

A solvent may be used alone, however, two or more solvents may also be used together. A mixture of a good solvent and a poor solvent is more preferably used to increase manufacturing efficiency. A mixed solvent being rich in a good solvent is preferable to increase solubility of the cellulose ester. The preferable mixing ratios are from 70 to 98 percent by weight of a good solvent, and from 2 to 30 percent of a poor solvent. Herein, a good solvent is described as being capable of dissolving cellulose ester with a single use, and a poor solvent as being incapable of dissolving nor swelling cellulose ester even. Sometimes, a solvent works as a good solvent of a cellulose ester, and sometimes as a poor solvent depending on the average acetification degree (degree of acetyl substitution) of the cellulose ester. For example, acetone is a good solvent for an acetic ester of a cellulose ester of which the acetification degree is 2.4, as well as for an acetatepropionate of a cellulose ester, however, it is a poor solvent for an acetic ester of a cellulose of which the acetyl group substitution degree is 2.8.

Good solvents used in the present invention include, for example: organic halides such as methylene chloride, dioxolanes, acetone, methyl acetate and methyl acetoacetate, of which methylene chloride and methyl acetate are specifically preferable.

Poor solvents used in the present invention include, for example: methanol, ethanol, n-butanol, cyclohexane and cyclohexanone, however, the present invention is not specifically limited thereto. A dope may preferably contain from 0.01 to 0.2 percent by weight of water.

In the step of preparing a dope, a cellulose ester is dissolved in a mixture of solvents using a common method. Dissolving a cellulose ester at a higher temperature is possible when the heating is carried out under a higher pressure. Formation of a gel or an insoluble agglomerate (known as "Mamako" in Japanese which represents insoluble residue when powder is dissolved in a solvent) may be avoided when the dissolving temperatures is higher than the ambient pressure boiling point of the mixed solvents, and simultaneously the temperature is in the range where the mixed solvents do not boil under the applied higher pressure. Further, as another preferable dissolving method, there is a method of moistening or swelling cellulose ester by mixing it with poor solvent, and thereafter, dissolving the cellulose ester by adding good solvent.

Pressure may be applied by injecting an inert gas such as nitrogen or by increasing the vapor pressure of the solvents by heating. Heating is preferably carried out from the outside of the container A jacket type heater is preferable because the temperature is easily controlled.

A higher dissolving temperature is preferable with respect to the solubility of the cellulose ester, however, too high a temperature may lower the productivity because the pressure also becomes too high. The dissolving temperature is preferably from 45 to 120° C., more preferably from 60 to 110° C. and still more preferably from 70 to 105° C. The pressure should be controlled not to allow boiling at the set temperature.

A low temperature dissolution method is also preferably utilized, by which cellulose ester is successfully dissolved in solvents such as methyl acetate.

In the next step, the cellulose ester solution thus prepared is filtered using an appropriate filter material. A filter material with a smaller absolute filtration accuracy is more preferable for removing impurities, however, too small a filtration accuracy easily cause clogging up of the filter. The absolute filtration accuracy of the filter is preferably not larger than 0.008 mm, more preferably from 0.001 to 0.008 mm and still more preferably from 0.003 to 0.006 mm.

The filter material used in the present invention is not specifically limited, and plastic filters (such as polypropylene and Teflon®) as well as metal (alloy) filters (such as stainless steel) are preferable, since these materials are free from peeling of a fiber, which may occur when fibrous material is used.

Impurities and, particularly, luminescent foreign materials contained in the cellulose ester are preferably diminished or entirely removed by filtering.

"Luminescent foreign materials" denote impurities which are observed as bright spots when a cellulose ester film is placed between two polarizing plates arranged in a crossed Nicol state, illuminated with a light from one side and observed from the other. The number of luminescent foreign materials of larger than 0.01 mm in diameter is preferably less than 200 per cm$^2$, more preferably less than 100 per cm$^2$ and still more preferably from 0 to 10 per cm$^2$. The number of luminescent foreign materials of less than 0.01 mm in diameter is preferably minimized.

The dope may be filtered by any common method. One of these preferable filtering methods is to filter the dope at temperatures which are higher than the ambient pressure boiling point of the mixed solvents, and simultaneously in the range where the mixed solvents do not boil under a higher pressure. This method is preferable because the pressure difference between before and after filtering is reduced. The filtering temperature is preferably from 45 to 120° C., more preferably from 45 to 70° C. and still more preferably from 45 to 55° C.

The pressure applied during filtering is preferably low, being preferably less than 1.6 MPa, more preferably less than 1.2 MPa and still more preferably less than 1.0 MPa.

Flow-casting of a dope will be explained below:

A metal support polished to a mirror finished surface is preferably used in the flow-casting step A polished stainless steel belt or a plated cast drum is used as a metal support. The width of the support is preferably from 1 to 4 m. The surface temperature of the metal support is preferably set −50° C. or more and not more than a temperature at which the solvent does not generate foams by boiling. A relatively high temperature of the support is more preferable because the web is more quickly dried, however, too high a temperature may cause foaming or the deterioration of flatness of the web. The temperature of the support is preferably from 0 to 100° C. and more preferably from 5 to 30° C. There is another preferable method in which a web is made to gel by being cooled and then is peeled from the drum on the condition that the web still contains much solvent. The method to control the temperature of the support is not specifically limited, and a method of blowing warm or cool air onto the support or a method of applying warm water on the rear side of the support may be employed. The method of using warm water is preferable with the reasons that since heat transmission is conducted efficiently, a time period necessary for making. The temperature of the metal support constant becomes shorter. In the case of using warm air, there is a case that air wind with a temperature higher than the target temperature is used with the consideration for decrease in the temperature of the web due to the evaporative latent heat of the solvent while using warm air higher than the boiling point of the solvent and preventing foaming. Especially, it is desirable to conduct drying efficiently by changing the temperature of the support and the temperature of drying air between the casting and the peeling.

In order to obtain a cellulose ester film with a sufficient flatness, the content of residual solvent in the web when it is peeled from a metal support is preferably from 10 to 150 percent by weight, more preferably from 20 to 40 or from 60 to 130 percent by weight, and specifically more preferably from 20 to 30 or from 70 to 120 percent by weight.

The residual solvent content of the web is defined by the following formula:

$$\text{Residual solvent content (\% by weight)} = \{(M-N)/N\} \times 100$$

Where M represents weight of a sample of the web collected in the manufacturing step or after manufacturing, and N represents weight of the same sample after it was dried at 115° C. for 1 hour.

In the drying step of a cellulose ester film, the film is peeled from a support and further dried. The content of residual solvent in the resulting film is preferably less than 1 percent by weight, more preferably 0.1 percent by weight or less, still more preferably 0 to 0.01 percent by weight or less.

In a drying process of a film, two methods may be employed, i.e., a roll drying method (in which a cellulose ester film is passed through many rollers placed alternatively up and down in a staggered manner), and a tenter method in which a cellulose ester film is transported while both sides of the film are clipped to put tension in the lateral direction.

In order to produce a cellulose ester film for the antireflection films of the present invention, it is desirable to stretch a web in a conveying direction in a place where the residual solvent amount in the web is much immediately after the web is peeled from a metal support, and to further stretch the web in a width direction by a tenter method which grasps the both ends of the web with a clip. The draw magnification is 1.01 to 1.3 times in both of the lengthwise direction and the transverse direction and more preferably 1.05 to 1.15 times. It is desirable that the area is expanded to 1.12 to 1.44 times by the stretching in the lengthwise direction and the transverse direction, and desirably 1.15 to 1.32 times. This can be obtained by multiplying the draw magnification of the lengthwise direction and the draw magnification of the transverse direction. If any one of the draw magnification of the lengthwise direction and the transverse direction is less than 1.01 times, when a hard coat layer is formed, the deterioration of the flatness by the UV irradiation is apt to easily occur.

In case of peeling it from a casting support, it is possible to stretch in a longitudinal direction with a peeling tension and a subsequent conveyance power. For example, it is preferable to peel off with a peeling tension of 210 N/m or more, more preferably 220 to 300 N/m.

A device to dry a web does not have a restriction specifically, and although it can generally carry out with a hot wind, infrared radiation, a heating roll, a microwave, etc., it is desirable to carry out by a hot wind in respect of simplicity.

As for the drying temperature in the drying process for a web, it is desirable to make it high gradually at 30 to 160° C. and it is still more desirable to make it high gradually at 50 to 160° C. in order to improve dimensional stability.

The thickness of a cellulose ester film is not limited specifically. However, the thickness of 10 to 200 μm is desirably used. Hitherto, it has been difficult to obtain an antireflection film excellent in flatness and scratch resistance from a thin film having a thickness of 10 to 70 μm However, according to the present invention, it is possible to obtain an antireflection film excellent in flatness and scratch resistance from a thin film, and also the antireflection film is excellent in productivity. Therefore, the thickness of a cellulose ester film is preferably 10 to 70 μm, more preferably 20 to 60 μm, still more preferably 35 to 60 μm. Moreover, a cellulose ester film made into a multilayered configuration by a multi casting method can also be used preferably. In the case that a cellulose ester film has a multilayered configuration, the film has a layer containing an ultraviolet absorber and a plasticizer, and the layer may be a core layer, a skin, or both of them.

An antireflection film having a width of 1.4 to 4 m is used preferably as the antireflection film of the present invention. The length is preferably 300 to 5000 m in a roll-formed film, more preferably 1000 to 4000 m. Further, the center line average roughness (Ra) of the surface of a cellulose ester film on which a card coat layer is provided is preferably 0.001 to 1 μm.

When the width of a cellulose ester film becomes large, there are problems that the illumination unevenness of irradiated light in the case of ultraviolet curing cannot be ignored, the flatness deteriorates, the unevenness of hardness occurs and the reflective unevenness in the case that an antireflection layer is formed on the film becomes remarkable. Since the sufficient hardness can be obtained with a small amount of exposure in the antireflection film of the present invention, even if an exposure amount of irradiated light is uneven in the width direction, the hardness unevenness in the width direction is hardly occur, and also an antireflection film excellent in flatness can be obtained. Therefore, remarkable effects are recognized even in a wider width cellulose ester film. Especially, a film having a width of 1.4 to 4 m is preferably used and more preferably the width is 1.4 to 3 m. If the width is larger than 4 m, the conveyance becomes difficult (Polarizing Plate)

A polarizing plate of the present invention will be described below.

A polarizing plate of the present invention can be produced by an ordinary method. The reverse surface side (the side being not provided with an antireflection layer) of an antireflection film of the present invention is subjected to alkaline saponification processing. It is desirable that the saponification-processed antireflection film is pasted with complete saponification polyvinyl alcohol solution to at least one surface of a polarizing film produced by a process of stretching a polyvinyl alcohol film immersed in iodine solution. The another surface of the polarizing film may also be pasted with this antireflection film or it may be pasted with another polarizing plate protection film. As a polarizing plate protective film used for another surface opposite to the antireflection film of the present invention, a cellulose ester film having an in-plane retardation $R_0$ ranging from 0 to 10 nm and a retardation in the thickness direction $R_t$ ranging from –30 to 30 nm measured, at 590 nm or a cellulose ester film disclosed in JP-A (Japanese Patent Unexamined Publication No.) 2003-12859 is listed as preferable example. Alternatively, the polarizing plate protective film is preferably used to serves also as a retardation film or an optical compensation film, and is preferably an optical compensation film (retardation film) having an in-plane retardation $R_0$ ranging from 20 to 70 nm and a retardation in the thickness direction $R_t$ ranging from 100 to 400 nm measured at 590 nm. These films can be produced by methods described in JP-A 2002-71957 and 2002-155395. Further, it may be preferable to use a polarizing plate protective film serving also as an optical compensation film having an optically anisotropic layer formed by orientating a liquid crystal compound such as discotic liquid crystals. For example, the optically anisotropic layer can be formed by a method disclosed in JP-A 2003-98348. By the use of a combination with the antireflection film of the present invention, it is possible to obtain a polarizing plate which is excellent in flatness and has a stable effect of enlarging a viewing angle.

As a polarizing plate protective film used for the reverse side, a commercial cellulose ester film, such as KC8UX, KC4UX, KC5UX, KC8UCR3, KC8UCR4, KC8UCR5, KC8UY, KC4UY, KC12UR, KC4FR-1, KC8UE, and KC4UE (produced by Konica Minolta Opto. Inc.) can be used preferably.

The thickness of the polarizing plate protective film at the antireflection film side and the thickness of the polarizing plate protective film used for the back side may be the same thickness. Alternatively, polarizing plate protective films having respective different thicknesses may be combined to form a polarizing plate such that for example, the thickness at the antireflection film side is 8.0 μm and the thickness of the polarizing plate protective film used for the back side is 40 to 60 μm.

A polarizing film, which is a prime element that constructs a polarizing plate, is a device that transmits only light in one certain direction through a polarizing face. Typical polarizing films currently known are polyvinyl alcohol type polarizing films, which include those dyed with iodine and those dyed with a dichromatic dye. However, it is not limited to these. Currently used polarizing films are produced in such a way that a polyvinyl alcohol solution is formed into a film, then, the film is uniaxially stretched and then dyed, or the formed film is dyed first and then uniaxially stretched. Thereafter, the film is preferably subjected to durability processing with a boron compound. The thickness of the polarizing film is 5 to 30 μm, preferably 8 to 15 μm. One surface of the antireflection film of the present invention is stuck on the surface of the polarizing film to form a polarizing plate, preferably with a water type adhesive primarily composed of completely saponified polyvinyl alcohol etc.

(Display Apparatus)

By incorporating the surface of an antireflection film of a polarizing plate of the present invention into a display apparatus at a viewing side, the display apparatus of the present invention having various aspects of high visibility can be produced. The antireflection film of the present invention are preferably used in reflection types, transparent types, and semi-transparent types of LCDs, and also preferably used in LCDs, with various driving systems, such as TN type, STN type, OCB type, HAN type, VA type, IPS type, etc. Further, the antireflection film of the present invention cause extremely slight color unevenness of reflected lights on the antireflection layer, has low reflectance and excels in flatness, and therefore, are preferably used in various types of display apparatuses such as plasma displays, field emission displays, organic EL displays, inorganic EL displays, and electronic papers. Particularly, in a display apparatus with a large screen not smaller than a 30-inch type, color unevenness or wavy irregularities are very small, there is an effect of preventing eyestrains even for long time viewing.

EXAMPLE

Hereinafter, the present invention will be explained in detail with reference to Examples. However, the present invention is not limited to these examples. Here, in Examples, the terms "part" and "%" are used. As long as there is no notice in particular, the terms represent "parts by weight" and "% by weight".

Example 1

(Coating of a Hard Coat Layer)

A transparent resin film was wound off from a rolled form of a triacetyl cellulose film (product name: KC8UX2M, produced by Konica Minolta Opto. Inc.) having a length of 3000 m and a thickness of 80 μm, and the below-mentioned hard coat layer coating liquid was coated on the film with a coating width of 1.4 m by a coating die and was dried at 80° C. Thereafter, the coated layer was cured by being irradiated with ultraviolet rays at 120 mJ/cm² by a high pressure mercury vapor lamp, whereby a hard coat layer was provided so as to be 6 μm in thickness after the curing.

(Hard Coat Layer Coating Liquid)

| | |
|---|---|
| Acetone | 45 parts by weight |
| Ethyl acetate | 45 parts by weight |
| PGME (propylene glycol monomethyl ether) | 10 parts by weight |
| pentaerythritol triacrylate | 30 parts by weight |
| Pentaerythritol tetra acrylate | 45 parts by weight |
| Urethane acrylate (trade name U-4HA produced by Shin-Nakamura Chemical Co., Ltd.) | 25 parts by weight |
| 1-hydroxy-cyclohexyl phenyl ketone (Irgacure 184, produced by Ciba Specialty Chemicals Inc.) | 5 parts by weight |
| 2-methyl-1-[4-(methyl thio)phenyl]-2-[monoforino]-1-one (Irgacure 907, produced by Ciba Specialty Chemicals Inc.) | 3 parts by weight |
| BYK-331 (silicone surfactant, produced by BYK-Chemie Japan K.K.) | 0.5 parts by weight |

(Coating of a Back Coat Layer)

The below-mentioned back coat layer coating liquid was coated on a surface of the film opposite to the surface on which the above hard coat layer was coated by a die coater such that a wet layer thickness became 14 μm, and dried at 70° C. Thereafter, the film was wound up into a roll form, whereby Hard coat film 1-1 was produced.

(Back Coat Layer Coating Liquid)

| | |
|---|---|
| Diacetyl cellulose (acetyl group substitution degree: 2.4) | 0.2 parts by weight |
| Acetone | 35 parts by weight |
| Methanol | 30 parts by weight |
| Methyl ethyl ketone | 35 parts by weight |
| Ultrafine particle silica: Aerosil 200V (produced by Nippon Aerosil Co., Ltd.) 2% acetone dispersion | 0.12 parts by weight |

Hard coat films 1-2 to 1-61 shown in Tables 1 and 2 were produced with the same way as that for Hard coat film 1-1 except that the surfactant BYK-331 (0.5 parts by weight) was changed to the surfactants and the additive amounts indicated in Tables 1 and 2. Here, in Tables, the expression "KF-351 (0.3 parts by weight)/Megaface F-482 (0.2 parts by weight) represents that two kinds of surfactants were used in combination with the parts by weights indicated in ( ).

Next, the above-produced Hard coat films 1-1 to 1-61 were preserved on the condition of the rolled form in a temperature controlled bath of 40° C. and 80% relative humidity for 4 days. Then, after the preservation, Hard coat films were wound off from the rolled form, and an reflection layer was coated on the surface of the hard coat layer in the order of a medium refractive index layer and a low refractive index layer in the following ways, whereby Antireflection films 1-1 to 1-61 were produced.

(Production of Antireflection Films)

(Coating of Medium Refractive Index Layer)

The following medium refractive index layer coating liquid was coated on the surface of the hard coat layer by a die coater, and was dried at 80° C. Thereafter, the coating layer was cured by being irradiated with ultraviolet rays at 120 mJ/cm² by a high pressure mercury vapor lamp, whereby a medium refractive index layer was provided so as to be 110 nm in thickness after the curing. The refractive index was 1.60.

(Medium Refractive Index Layer Coating Liquid)

(Production of Particle Dispersion A)

Into 6.0 kg of methanol dispersion antimony multiple oxide colloid (60% of solid content, zinc antimonate sol produced by Nissan Chemical Industries, Ltd., Ltd., product name: CELNAX CX-Z610M-F2), 12.0 kg of isopropyl alcohol was added gradually while being agitated, whereby Particle dispersion A was prepared.

| | |
|---|---|
| PGME (propylene glycol monomethyl ether) | 40 parts by weight |
| Isopropyl alcohol | 25 parts by weight |
| Methyl ethyl ketone | 25 parts-by-weight |
| Pentaerythritol triacrylate | 0.9 parts by weight |
| Pentaerythritol tetra acrylate | 1.0 parts-by-weight |
| Urethane acrylate (product name: U-4HA produced by Shin-Nakamura Chemical Co., Ltd.) | 0.6 parts by weight |
| Particle dispersion A | 20 parts-by-weight |
| 1-hydroxy-cyclohexyl phenyl ketone (Irgacure 184, produced by Ciba Specialty Chemicals Inc.) | 0.4 parts by weight |
| 2-methyl-1-[4-(methyl thio)phenyl]-2-[monoforino propan]-1-one (Irgacure 907, produded by Ciba Specialty Chemicals Inc.) | 0.2 parts by weight |
| 10% FZ-2207, propylene-glycol-monomethyl-ether solution (produced by Nippon Unicar) | 0.4 parts by weight |

(Coating of a Low Refractive Index Layer)

The below-mentioned low refractive index layer coating liquid was coated on the above medium refractive index layer by a coating die and was dried at 80° C. Thereafter, the coated layer was cured by being irradiated with ultraviolet rays at 120 mJ/cm² by a high pressure mercury vapor lamp, whereby a low refractive index layer was provided so as to be 92 nm in thickness after the curing and an antireflection film was produced. Here, the refractive index was 1.38.

(Low Refractive Index Layer Coating Liquid)

<Preparation of Tetraethoxysilane Hydrolyzate A>

With 440 g of ethanol, 230 g of tetra-ethoxysilane (product name: KBE04, produced by Shin-Etsu Chemical Co., Ltd.) was mixed. Into this mixture, 120 g of 2% acetic acid aqueous solution was added, and the resultant solution was stirred at a room temperature (25° C.) for 26 hours, whereby tetra-ethoxysilane hydrolyzate A was prepared.

| | |
|---|---|
| Propylene glycol monomethyl ether | 430 parts by weight |
| Isopropyl alcohol | 430 parts by weight |
| Tetra-ethoxysilane hydrolyzate A | 120 parts by weight |
| γ-methacryloxy propyl trimethoxysilan (product name: KBM503, Shin-Etsu Chemical Co., Ltd. make) | 3.0 parts by weight |
| Isopropyl alcohol dispersed hollow silica sol (solid content of 20%, silica sol produced by Catalysts & Chemicals Industries Co., Ltd., product name: ELCOM V-8209) | 40 parts by weight |
| Aluminum ethylacetoacetate diisopropylate (ALCH produced by Kawaken Fine Chemicals Co., Ltd.) | 3.0 parts by weight |
| 10% FZ-2207, propylene glycol monomethyl ether solution (produced by Nippon Unicar Corporation) | 3.0 parts by weight |

<Evaluation of an Antireflection Film>

The above-produced antireflection films were evaluated in terms of the following items.

The results are indicated in Table 1 and Table 2.

1. Chemical Resistance

<Solvent Resistance>

The same portion of a surface of antireflection film was strongly rubbed 30 times with a bemcot (BEMCOT M-3 produced by Asahi Chemical Industry Co., Ltd.) which was impregnated with methyl ethyl ketone. After the rubbing, the change of the surface condition of the rubbed portion was observed on the following criteria.

A: With no change

B: Film peeling and the like occurred slightly.

C: The external appearance was changed, such as film peeling.

<Alkali Resistance>

The same portion of a surface of antireflection film was strongly rubbed 30 times with a bemcot (BEMCOT M-3 produced by Asahi Chemical Industry Co., Ltd.) which was impregnated with 20% sodium hydroxide aqueous solution. After the rubbing, the change of the surface condition of the rubbed portion was observed on the following criteria.

A: With no change

B: Film peeling and the like occurred slightly.

C: The external appearance was changed, such as film peeling.

<Acid Resistance>

The same portion of a surface of antireflection film was strongly rubbed 30 times with a bemcot (BEMCOT M-3 produced by Asahi Chemical Industry Co., Ltd.) which was impregnated with 200% hydrochloric acid aqueous solution. After the rubbing, the change of the surface condition of the rubbed portion was observed on the following criteria.

A: With no change

B: Film peeling and the like occurred slightly

C: The external appearance was changed, such as film peeling.

2. Surface Hardness

The humidity of an antireflection film was conditioned on the conditions of 25° C. and a relative humidity of 60% for 2 hours. Thereafter, in accordance with the pencil hardness evaluation method specified in JIS K 5400 by use of examination pencils specified in JIS S6006, scratching was repeated 5 times with a pencil of each hardness by use of a 1 kg weight, thereby the hardness was measured until one scratch line. Here, the scratch specified in JIS K 5400 is a tear of a coating layer and a scratch on a coating layer, and a dent on a coating layer is not specified as a scratch. However, in this evaluation, a dent on a coating layer was included in the scratch. A high numeral means a high hardness.

3. Moisture and Heat Resistance Adhesion

An antireflection film was cut into a size of 3 cm×4 cm and the cut piece with an obverse side surface of an antireflection layer was preserved on a high temperature and high humidity condition of 60° C. and 90%. Thereafter, cut-in was made along 11 lines longitudinally and transversely with an interval of 1 mm on the surface of the antireflection layer by a single blade razor with an angle of 90° to the blade, whereby 100 grid patterns with 1 mm angles were produced. A commercially available cellophane tape was pasted on the surface of the antireflection layer. After that, the cellophane tape was peeled off from the surface in such a way that one end of the cellophane tape was pulled up vertically by hand. Then, the ratio of the area of a peeled-off thin layer to the area of the pasted cellophane tape was visually judged from the cut-in lines and was evaluated based on the following criterions. This result is also indicated in Table 1 and Table 2

AA: no portion was peeled off.

A: The peeled-off area ration was 5% or less.

B: The peeled-off area ration was less than 10%.

C: The peeled-off area ration was 10% or more.

TABLE 1

| | Hard coat layer coating liquid | | Evaluation of antireflection film | | | | | |
|---|---|---|---|---|---|---|---|---|
| | | Content ratio by | Chemical resistance | | | | Moisture and heat | |
| *1 | Surfactant (additive amount) | weight of surfactants | Solvent resistance | Alkali resistance | Acid resistance | Surface hardness | resistance adhesive | Remarks |
| 1-1 | BYK-331 (0.5 Parts by weight) | — | B | C | C | 2 H | B | Comp. |
| 1-2 | TSF4440 (0.5 Parts by weight) | — | C | C | C | 2 H | B | Comp. |
| 1-3 | KF-351 (0.5 Parts by weight) | — | B | C | B | 2 H | B | Comp. |
| 1-4 | KF-351 (0.3 Parts by weight)/ BYK-331 (0.2 Parts by weight) | 1.0:0.67 | B | C | C | 2 H | B | Comp. |
| 1-5 | KF-351 (0.3 Parts by weight)/ Megaface F-482 (0.2 Parts by weight) | 1.0:0.67 | B | C | C | 2 H | B | Comp. |
| 1-6 | KF-351 (0.3 Parts by weight)/ Megaface F-479 (0.2 Parts by weight) | 1.0:0.67 | B | C | B | 2 H | B | Comp. |
| 1-7 | KF-351 (0.3 Parts by weight)/ TS4440 (0.2 Parts by weight) | 1.0:0.67 | C | C | B | 2 H | B | Comp. |
| 1-8 | EMULGEN 404 (0.5 Parts by weight) | — | B | B | B | 2 H | B | Comp. |
| 1-9 | EMULGEN LS-110 (0.5 Parts by weight) | — | B | C | C | 2 H | B | Comp. |
| 1-10 | EMULGEN 7070.5 Parts by weight) | — | B | C | C | 2 H | B | Comp. |
| 1-11 | EMULGEN 404 (0.3 Parts by weight)/ KF-351 (0.5 Parts by weight) | 1.0:1.7 | B | B | B | 2 H | B | Comp. |
| 1-12 | EMULGEN 404 (0.3 Parts by weight)/ KF-351 (0.4 Parts by weight) | 1.0:1.3 | B | B | B | 2 H | B | Comp. |
| 1-13 | EMULGEN 404 (0.3 Parts by weight)/ KF-351 (0.3 Parts by weight) | 1.0:1.0 | A | A | A | 3 H | A | Inv. |
| 1-14 | EMULGEN 404 (0.3 Parts by weight)/ KF-351 (0.2 Parts by weight) | 1.0:0.67 | A | A | A | 3 H | AA | Inv. |
| 1-15 | EMULGEN 404 (0.3 Parts by weight)/ KF-351 (0.1 Parts by weight) | 1.0:0.33 | A | A | A | 3 H | AA | Inv. |
| 1-17 | EMULGEN 404 (0.3 Parts by weight)/ KF-351 (0.05 Parts by weight) | 1.0:0.17 | A | A | A | 3 H | A | Inv. |
| 1-18 | EMULGEN 404 (0.3 Parts by weight)/ KF-351 (0.025 Parts by weight) | 1.0:0.08 | B | B | B | 2 H | B | Comp. |

TABLE 1-continued

| *1 | Surfactant (additive amount) | Content ratio by weight of surfactants | Solvent resistance | Alkali resistance | Acid resistance | Surface hardness | Moisture and heat resistance adhesive | Remarks |
|---|---|---|---|---|---|---|---|---|
| 1-19 | EMULGEN 404 (0.3 Parts by weight)/ KF-351 (0.015 Parts by weight) | 1.0:0.05 | B | B | B | 2 H | B | Comp. |
| 1-20 | EMULGEN 404 (0.6 Parts by weight)/ KF-351 (0.8 Parts by weight) | 1.0:1.3 | B | B | B | 2 H | B | Comp. |
| 1-21 | EMULGEN 404 (0.6 Parts by weight)/ KF-351 (0.6 Parts by weight) | 1.0:1.0 | A | A | A | 3 H | A | Inv. |
| 1-22 | EMULGEN 404 (0.6 Parts by weight)/ KF-351 (0.4 Parts by weight) | 1.0:0.67 | A | A | A | 3 H | AA | Inv. |
| 1-23 | EMULGEN 404 (0.6 Parts by weight)/ KF-351 (0.1 Parts by weight) | 1.0:0.17 | A | A | A | 3 H | A | Inv. |
| 1-24 | EMULGEN 404 (0.6 Parts by weight)/ KF-351 (0.05 Parts by weight) | 1.0:0.08 | B | B | B | 2 H | B | Comp. |
| 1-25 | EMULGEN 404 (0.3 Parts by weight)/ BYK-331 (0.4 Parts by weight) | 1.0:1.3 | B | C | B | 2 H | B | Comp. |
| 1-26 | EMULGEN 404 (0.3 Parts by weight)/ BYK-331 (0.3 Parts by weight) | 1.0:1.0 | A | A | A | 3 H | A | Inv. |
| 1-27 | EMULGEN 404 (0.3 Parts by weight)/ BYK-331 (0.2 Parts by weight) | 1.0:0.67 | A | A | A | 3 H | AA | Inv. |
| 1-28 | EMULGEN 404 (0.3 Parts by weight)/ BYK-331 (0.1 Parts by weight) | 1.0:0.33 | A | A | A | 3 H | AA | Inv. |
| 1-29 | EMULGEN 404 (0.3 Parts by weight)/ BYK-331 (0.05 Parts by weight) | 1.0:0.17 | A | A | A | 3 H | A | Inv. |
| 1-30 | EMULGEN 404 (0.3 Parts by weight)/ BYK-331 (0.025 Parts by weight) | 1.0:0.08 | B | C | C | 2 H | B | Comp. |

Megaface F-482: perfluoroalkyl group • lipophilic group containing oligomer (produced by Dainippon Ink & Chemicals, Inc.),
Megaface F-479: perfluoroalkyl group • hydrophilic group • lipophilic group containing oligomer (produced by Dainippon Ink & Chemicals, Inc.),
*1: Hard coat film/antireflection film No.,
Comp.: Comparative example
Inv.: Inventive example

TABLE 2

| *1 | Surfactant (additive amount) | Content ratio by weight of surfactants | Solvent resistance | Alkali resistance | Acid resistance | Surface hardness | Moisture and heat resistance adhesive | Remarks |
|---|---|---|---|---|---|---|---|---|
| 1-31 | EMULGEN 404 (0.3 Parts by weight)/ BYK-331 (0.015 Parts by weight) | 1.0:0.05 | B | C | C | 2 H | B | Comp. |
| 1-32 | EMULGEN 408 (0.3 Parts by weight)/ KF-351 (0.5 Parts by weight) | 1.0:1.7 | B | C | C | 2 H | B | Comp. |
| 1-33 | EMULGEN 408 (0.3 Parts by weight)/ KF-351 (0.4 Parts by weight) | 1.0:1.3 | B | C | B | 2 H | B | Comp. |
| 1-34 | EMULGEN 408 (0.3 Parts by weight)/ KF-351 (0.3 Parts by weight) | 1.0:1.0 | A | A | A | 3 H | A | Inv. |
| 1-35 | EMULGEN 408 (0.3 Parts by weight)/ KF-351 (0.2 Parts by weight) | 1.0:0.67 | A | A | A | 3 H | AA | Inv. |
| 1-36 | EMULGEN 408 (0.3 Parts by weight)/ KF-351 (0.1 Parts by weight) | 1.0:0.33 | A | A | A | 3 H | AA | Inv. |
| 1-37 | EMULGEN 408 (0.3 Parts by weight)/ KF-351 (0.05 Parts by weight) | 1.0:0.17 | A | A | A | 3 H | A | Inv. |
| 1-38 | EMULGEN 408 (0.3 Parts by weight)/ KF-351 (0.025 Parts by weight) | 1.0:0.08 | B | C | B | 2 H | B | Comp. |
| 1-39 | EMULGEN 408 (0.3 Parts by weight)/ KF-351 (0.015 Parts by weight) | 1.0:0.05 | B | C | B | 2 H | B | Comp. |
| 1-40 | EMULGEN LS-110 (0.3 Parts by weight)/ KF-351 (0.5 Parts by weight) | 1.0:1.7 | B | C | C | 2 H | B | Comp. |
| 1-41 | EMULGEN LS-110 (0.3 Parts by weight)/ KF-351 (0.4 Parts by weight) | 1.0:1.3 | B | C | B | 2 H | B | Comp. |
| 1-42 | EMULGEN LS-110 (0.3 Parts by weight)/ KF-351 (0.3 Parts by weight) | 1.0:1.0 | A | A | A | 3 H | A | Inv. |
| 1-43 | EMULGEN LS-110 (0.3 Parts by weight)/ KF-351 (0.2 Parts by weight) | 1.0:0.67 | A | A | A | 3 H | AA | Inv. |

TABLE 2-continued

| | | Hard coat layer coating liquid | | Evaluation of antireflection film | | | | | |
|---|---|---|---|---|---|---|---|---|---|
| | | | Content ratio | Chemical resistance | | | | Moisture and heat | |
| *1 | Surfactant (additive amount) | | by weight of surfactants | Solvent resistance | Alkali resistance | Acid resistance | Surface hardness | resistance adhesive | Remarks |
| 1-44 | EMULGEN LS-110 (0.3 Parts by weight)/ KF-351 (0.1 Parts by weight) | | 1.0:0.33 | A | A | A | 3 H | AA | Inv. |
| 1-45 | EMULGEN LS-110 (0.3 Parts by weight)/ KF-351 (0.05 Parts by weight) | | 1.0:0.17 | A | A | A | 3 H | A | Inv. |
| 1-46 | EMULGEN LS-110 (0.3 Parts by weight)/ KF-351 (0.025 Parts by weight) | | 1.0:0.08 | B | C | B | 2 H | B | Comp. |
| 1-47 | EMULGEN LS-110 (0.3 Parts by weight)/ KF-351 (0.015 Parts by weight) | | 1.0:0.05 | B | C | C | 2 H | B | Comp. |
| 1-48 | EMULGEN 707 (0.3 Parts by weight)/ KF-351 (0.5 Parts by weight) | | 1.0:1.7 | B | C | C | 2 H | B | Comp. |
| 1-49 | EMULGEN 707 (0.3 Parts by weight)/ KF-351 (0.4 Parts by weight) | | 1.0:1.3 | B | C | C | 2 H | B | Comp. |
| 1-50 | EMULGEN 707 (0.3 Parts by weight)/ KF-351 (0.3 Parts by weight) | | 1.0:1.0 | A | A | A | 3 H | A | Inv. |
| 1-51 | EMULGEN 707 (0.3 Parts by weight)/ KF-351 (0.2 Parts by weight) | | 1.0:0.67 | A | A | A | 3 H | AA | Inv. |
| 1-52 | EMULGEN 707 (0.3 Parts by weight)/ KF-351 (0.1 Parts by weight) | | 1.0:0.33 | A | A | A | 3 H | AA | Inv. |
| 1-53 | EMULGEN 707 (0.3 Parts by weight)/ KF-351 (0.05 Parts by weight) | | 1.0:0.17 | A | A | A | 3 H | A | Inv. |
| 1-54 | EMULGEN 707 (0.3 Parts by weight)/ KF-351 (0.025 Parts by weight) | | 1.0:0.08 | B | C | C | 2 H | B | Comp. |
| 1-55 | EMULGEN 707 (0.3 Parts by weight)/ KF-351 (0.015 Parts by weight) | | 1.0:0.05 | B | C | C | 2 H | B | Comp. |
| 1-56 | EMULGEN 120 (0.3 Parts by weight)/ KF-351 (0.2 Parts by weight) | | 1.0:0.67 | A | A | A | 3 H | AA | Inv. |
| 1-57 | EMULGEN 120 (0.3 Parts by weight)/ TSF4440 (0.2 Parts by weight) | | 1.0:0.67 | A | A | A | 3 H | AA | Inv. |
| 1-58 | EMULGEN 420 (0.3 Parts by weight)/ KF-351(0.2 Parts by weight) | | 1.0:0.67 | A | A | A | 3 H | AA | Inv. |
| 1-59 | EMULGEN 420 (0.3 Parts by weight)/ TSF4440 (0.2 Parts by weight) | | 1.0:0.67 | A | A | A | 3 H | AA | Inv. |
| 1-60 | **/KF-351 (0.2 Parts by weight) | | 1.0:0.67 | A | A | A | 3 H | AA | Inv. |
| 1-61 | **/TSF4440 (0.2 Parts by weight) | | 1.0:0.67 | A | A | A | 3 H | AA | Inv. |

*1: Hard coat film/antireflection film No., Comp.: Comparative example, Inv.: Inventive example
**NOFABLEEAO-9905 (0.3 Parts by weight)

As can be understood from the results shown in Table 1 and Table 2, when a silicone surfactant and a nonionic polyoxy ether compound are added and the content ratio by weight of the silicone surfactant and the nonionic polyoxy ether compound is within a range of the present invention, it is noticed that the corresponding samples exhibit excellent performances in all items of chemical resistance, surface hardness and moisture and heat resistant adhesion.

Further, the corresponding samples exhibit excellent results in items of scratch resistance and antifouling property. Here, the scratch resistance is judged in such a way that the same portion of a surface of antireflection film is rubbed 10 reciprocations with steel wool, and after the rubbing, the scratch resistance was judged from the observation for the scratch state of the rubbed portion. (Steel wool: a product (grade No. 0000) produced by Japanese Steel wool Corporation, Applied load: 500 g/cm$^2$, Tip contact area: 1 cm×1 cm) Also, the antifouling property is judged in such a way that a character is written on a surface of antireflection film with a black oily marker (Mackee Ultrathin, produced by Zebra Corporation), then the character is wiped off to become clean by use of a bemcot (BEMCOT M-3 produced by Asahi Chemical Industry Co., Ltd.), further these writing and wiping are repeated 20 reciprocations on the same portion, and after that, the antifouling property is judged from the observation of the wiping-off property.

Further, the surface of a roll-formed hard coat film in which an antireflection film of the present invention was laminated was observed with regard to the states of repelling and voids by use of a magnifying lens having a magnification of 50 times. As a result, repelling and voids were not observed and the film has good coating properties.

Example 2

Antireflection films 2-1 to 2-7 were produced with the same ways as that in Example 1 except that the preserving condition of the hard coat film in hard coat films 1-13, 1-35, 1-43, 1-51, 1-56, 1-58 and 1-60 in Example 1 was changed to seven days and the preserving time period for the moisture and heat resistance adhesion was changed to 500 hours, and the same evaluation as that in Example 1 was conducted. Further, the crack resistance was evaluated by an enforced deterioration test with the following ways. These evaluation results are shown in Table 3.

(Crack Resistance)

Antireflection films were preserved for 24 hours under the condition of 80° C. and 20% RH and then for 24 hours under the condition of 80° C. and 80% RH by use of a cycle thermo testing machine. Subsequently, this preservation was repeated for 17 days. Thereafter, the sample films were wound around round rods having respective diameters of 5, 10 and 20 mm and the occurrence of cracks was observed. Here, when cracks occurred on the condition of a round bar having a larger diameter, this indicates that the crack resistance is weaker.

The above PVA film was continuously processed by in order of preliminary swelling, dyeing, uniaxial stretching by a wet method, fixing treatment, drying, and heat treatment, whereby a polarization film was produced. The preliminary swelling was conducted in such a way that the PVA film was dipped in water at 30° C. for 30 seconds. Then, the PVA film was dipped in an aqueous solution having an iodine concen-

TABLE 3

| | Hard coat layer coating liquid | | Evaluation of antireflection film | | | | | |
|---|---|---|---|---|---|---|---|---|
| | | Content ratio | Chemical resistance | | | | | |
| *1 | Surfactant (additive amount) | by weight of surfactants | Solvent resistance | Alkali resistance | Acid resistance | Surface hardness | *2 | Cracks |
| 2-1 | EMULGEN 404 (0.3 Parts by weight)/ KF-351 (0.2 Parts by weight) | 1.0:0.67 | A | A | A | 3 H | AA | No occurrence with 5 mm |
| 2-2 | EMULGEN 408 (0.3 Parts by weight)/ KF-351 (0.2 Parts by weight) | 1.0:0.67 | A | A | A | 3 H | AA | No occurrence with 5 mm |
| 2-3 | EMULGENLS-110 (0.3 Parts by weight)/ KF-351 (0.2 Parts by weight) | 1.0:0.67 | A | A | A | 3 H | A | Occurrence with 10 mm |
| 2-4 | EMULGEN 707 (0.3 Parts by weight)/ KF-351 (0.2 Parts by weight) | 1.0:0.67 | A | A | A | 3 H | A | Occurrence with 10 mm |
| 2-5 | EMULGEN 120 (0.3 Parts by weight)/ KF-351 (0.2 Parts by weight) | 1.0:0.67 | A | A | A | 3 H | A | Occurrence with 10 mm |
| 2-6 | EMULGEN 420 (0.3 Parts by weight)/ KF-351 (0.2 Parts by weight) | 1.0:0.67 | A | A | A | 3 H | AA | No occurrence with 5 mm |
| 2-7 | NOFABLEEAO-9905 (0.3 Parts by weight)/ KF-351 (0.2 Parts by weight) | 1.0:0.67 | A | A | A | 3 H | AA | No occurrence with 5 mm |

*1: Hard coat film/antireflection film No.,
*2: Moisture and heat resistance adhesive As can be understood from the results shown in Table 3, on the severer conditions, when a silicone surfactant and a compound represented by Formula (1) among the nonionic polyoxy ether compound are added together within the range of the present invention, it is noticed that the film exhibits excellent performances especially in items of crack resistance and moisture and heat resistant adhesion.

Example 3

Next, polarizing plates were produced with the following ways by use of antireflection films 1-1 to 1-61 and 2-1 to 2-7 produced in Examples 1 and 2, and the polarizing plates were installed in a liquid crystal display panel (image display device) and the visibility was evaluated.

In accordance with the following methods, polarizing plates 1-1 to 1-61 and 2-1 to 2-7 were produced by use of one sheet of each of the above antireflection films 1-1 to 1-61 and 2-1 to 2-7 and a cellulose ester based optical compensation film of KC8UCR5 (produced by Konica Minolta Opto. Inc.) as a polarizing plate protective film.

(a) Production of a Polarizing Film

In 100 parts by weight of polyvinyl alcohol (hereafter, abbreviated as PVA) having a saponification degree of 99.95 mol % and a polymerization degree of 2400, a composition impregnated with 100 parts by weight of glycerin and 170 parts by weight of water was melted, kneaded and was subjected to a defoaming process. Subsequently, the resultant melted liquid was extruded on a metal roll from a T die so as to form a film. Then, the film was dried and subjected to a heat treatment, whereby a PVA film was obtained. The thus obtained PVA film has an average thickness of 40 μm, a moisture percentage of 4.4% and a film width of 3 m.

tration of 0.4 g/liter and a potassium iodide concentration of 40 g/liter at 35° C. for 3 minutes. Subsequently, the film was uniaxially stretched to 6 times in an aqueous solution having a boric acid concentration of 4% at 50° C. under the condition that a tension applied to the film was 700 N/m. Then, the fixing process was conducted in such a way that the film was dipped in an aqueous solution having a potassium iodide concentration of 40 g/liter, a boric acid concentration of 40 g/liter and a zinc chloride concentration of 10 g/liter at 30° C. for 5 minutes. Thereafter, the P1A film was taken out, dried with hot air of 40° C., and further subjected to a heat treatment at 100° C. for 5 minutes. The thus obtained polarizing film had an average thickness of 13 μm and as a polarizing performance a transmittance of 43.0%, a polarization degree of 99.5% and a dichroic ratio of 40.1.

(b) Production of a Polarizing Plate

Next, in accordance with the following processes of 1 to 5, polarizing films and polarizing plate protective films were pasted to each other, whereby polarizing plates 1-1 to 1-61 and 2-1 to 2-7 were produced.

Process 1:

Optical compensation films and antireflection films were immersed in 2 mol/L of sodium hydroxide solution at 60° C. for 90 seconds, and subsequently, were washed with water and dried. Onto the surface of the antireflection films on which antireflection layer was provided, a peelable protective film (made of PET) was previously pasted in order to protect the surface.

Similarly, optical compensation films were immersed in 2 mol/L of sodium hydroxide solution at 60° C. for 90 seconds, and subsequently, were washed with water and dried.

Process 2:

The above-mentioned polarization films were immersed in 2% by weight of a polyvinyl alcohol adhesive bath for 1 to 2 seconds.

Process 3:

Excessive adhesives adhered to the polarization film at Process 2 was lightly removed, and the polarization film was sandwiched between the optical compensation films and anti-reflection films subjected to the alkali treatment in Process 1, whereby a laminated structure was arranged.

Process 4:

The laminated structure was pasted by two rotating rollers with a pressure of from 20 to 30 N/cm$^2$ at a speed of about 2 m/minutes.

Process 5:

The samples produced in Process 4 were dried at 80° C. in a dryer for 2 minutes, whereby polarizing plates were produced.

The polarizing plate at the uppermost surface of a commercially available liquid crystal panel (VA type) was peeled off carefully, and at the place, the polarizing plates 1-1 to 1-61 and 2-1 to 2-7 were pasted with a matched polarizing orientation.

The liquid crystal panels 1-1 to 1-61 and 2-1 to 2-7 obtained with the above ways were arranged on a table having a height of 80 cm from the floor. Two day light straight tube fluorescent lamps (FLR40S-D/M-X produced by Matsushita Electric Industrial Co., Ltd.) 40 W were made one set and 10 sets of fluorescent lamps were arranged with an interval of 1.5 m on a ceiling section having a height of 3 m from the floor. At this time, when an evaluator stands at the front side of the display surface of the liquid crystal panel, the above fluorescent lamps were arranged on the ceiling section to be placed backward from the head of the evaluator. The liquid crystal display panels were inclined by 25° from the vertical direction on the table so that the above fluorescent lamps were reflected on the panels. On this condition, the easiness in observation (visibility) of a screen of each panels was evaluate with ranks as follows.

A: The reflection of the nearest fluorescent lamp was not worrisome and a character having a font size of 8 or less could be read clearly.

B: The reflection of the nearest fluorescent lamp was slightly worrisome. However the reflection of the distant fluorescent lamp was not worrisome. A character having a font size of 8 or less could be read with some difficulty.

C: The reflection of the distant fluorescent lamp was worrisome. It was difficult to read a character having a font size of 8 or less.

D: The reflection of the fluorescent lamp was very worrisome. On the reflected portion, a character having a font size of 8 or less could not be read.

As a result of the evaluations, any one of the liquid crystal display panels employing the antireflection film and the polarizing plate according to the present invention exhibited the evaluation result of A or B and was excellent in visibility in comparison with the liquid crystal display panels employing the comparative antireflection film and polarizing plate having exhibited the evaluation result of C or D.

Especially, the liquid crystal display panels 2-1 to 2-7 exhibited the evaluation result of A in all items and were excellent in visibility.

The invention claimed is:

1. A multi-layer film, comprising;
   a transparent resin film; and
   a hard coat layer provided on at least one surface of the transparent resin film; and
   a resin layer provided on the hard coat layer and being in contact with the surface of the hard coat layer;
   wherein the hard coat layer contains at least an actinic ray curable resin, a silicone surfactant and a polyoxy ether compound, and the content ratio by weight of the silicone surfactant and the polyoxy ether compound is 1.0:1.0 to 0.10:1.0.

2. The multi-layer film described in claim 1, wherein the content ratio by weight of the silicone surfactant and the polyoxy ether compound is 0.7:1.0 to 0.20:1.0.

3. The multi-layer film described in claim 1, wherein the polyoxy ether compound is a polyoxyethylene oleyl ether compound.

4. The multi-layer film described in claim 1, wherein the resin layer includes a low refractive index layer containing hollow silica fine particles.

5. A polarizing plate comprising:
   a polarizer; and
   the multi-layer film described in claim 1 and pasted on at least one surface of the polarizer.

6. A display device comprising:
   a screen; and
   the multi-layer film described in claim 1 and installed in the screen.

7. The multi-layer film described in claim 1, wherein the resin layer includes an actinic ray curable resin.

8. The multi-layer film described in claim 1, wherein the resin layer includes a fluorine type surfactant, a silicone oil or a silicone surfactant.

9. The multi-layer film described in claim 1, wherein the total additive amount of the silicone surfactant and the polyoxy ether compound is 0.1% by weight to 8.0% by weight to the actinic ray curable resin.

10. The multi-layer film described in claim 9, wherein the total additive amount is 0.2% by weight to 4.0% by weight.

11. A producing method of the multi-layer film described in claim 1, comprising the steps of:
    coating a hard coat layer on at least one of a transparent resin film;
    winding up the transparent resin film into a roll;
    winding off the transparent resin film from the roll; and
    coating a resin layer on the hard coat layer.

12. A multi-layer film produced by the producing method described in claim 11.

13. A polarizing plate comprising:
    a polarizer; and
    the multi-layer film described in claim 12 and pasted on at least one surface of the polarizer.

14. A display device comprising:
    a screen; and
    the multi-layer film described in claim 12 and installed in the screen.

15. The multi-layer film described in claim 1, wherein the resin layer is an antireflection film.

16. The multi-layer film described in claim 1, wherein the antireflection film includes metal oxide micro-particles.

17. The multi-layer film described in claim 1, wherein the polyoxy ether compound is one of polyoxyethylene alkyl ether compounds, polyoxy-alkyl phenyl ether compounds, polyoxy-alkylene alkyl ether, polyoxyethylene higher alcohol ether, and polyoxyethylene octyl dodecyl ether.

18. The multi-layer film described in claim 17, wherein the polyoxyethylene alkyl ether compounds includes polyoxyethylene alkyl ether, polyoxyethylene lauryl ether, polyoxyethylene cetyl ether, and polyoxyethylene stearylether.

19. The multi-layer film described in claim 17, wherein the polyoxy-alkyl phenyl ether compounds include polyoxyethylene nonylphenyl ether and polyoxyethylene octylphenyl ether.

* * * * *